US011468380B2

(12) United States Patent
Daugherty et al.

(10) Patent No.: US 11,468,380 B2
(45) Date of Patent: Oct. 11, 2022

(54) PLAN OF ACTION AND MILESTONES (POAANDM) AUTOMATED GENERATION ENGINE (PAGE) SYSTEM AND RELATED METHODS

(71) Applicant: The United States of America, as represented by the Secretary of the Navy, Crane, IN (US)

(72) Inventors: Bryan Daugherty, Sandborn, IN (US); Christopher A. Parker, Bloomington, IN (US); Tanya L. West, Linton, IN (US); Justin A. Sargent, Sandborn, IN (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 125 days.

(21) Appl. No.: 17/162,751

(22) Filed: Jan. 29, 2021

(65) Prior Publication Data

US 2021/0158252 A1    May 27, 2021

Related U.S. Application Data

(62) Division of application No. 15/683,464, filed on Aug. 22, 2017, now Pat. No. 10,949,784.

(Continued)

(51) Int. Cl.
*G06Q 10/06* (2012.01)
*G06F 21/62* (2013.01)
(Continued)

(52) U.S. Cl.
CPC ..... *G06Q 10/06313* (2013.01); *G06F 16/122* (2019.01); *G06F 21/577* (2013.01); *G06F 21/629* (2013.01); *G06Q 10/20* (2013.01)

(58) Field of Classification Search
None
See application file for complete search history.

(56) References Cited

U.S. PATENT DOCUMENTS

| | | | |
|---|---|---|---|
| 9,401,926 B1* | 7/2016 | Dubow | H04L 63/1408 |
| 2015/0378865 A1* | 12/2015 | Robertson | G06F 11/0709 |
| | | | 714/57 |
| 2017/0046374 A1* | 2/2017 | Fletcher | G06F 3/0484 |

OTHER PUBLICATIONS

Tzau et al. (Lessons Learned in Performing Technology Readiness Assessment (TRA) for the Milestone (MS) B Review of an Acquisition Category (ACAT) 1D Vehicle Program, Briefing charts, Army Tank Automotive Research Development and Engineering Center Warren MI, Accession No. ADA548237, Aug. 8, 2011).*

* cited by examiner

*Primary Examiner* — Matthew D Henry
(74) *Attorney, Agent, or Firm* — Naval Surface Warfare Center, Crane Division

(57) ABSTRACT

Plan of action and milestones (POA&M) automated generation engine (PAGE) systems are provided along with related methods. A number of distributed tamper protected configuration scanning systems configured to scan computer files in selected target systems across a network and generate target system configuration scan results files. The PAGE system also includes a number of POA&M configuration selection user interfaces and visualization systems enabling users to select, inform, and customize POA&M outputs based on POA&M configuration files that include POA&M library files that are associated with different types of plans or actions (e.g., cyber security configuration for networked computers). An expert system is also provided for receiving a plurality of configuration file inputs (e.g., configuration scan results file and various baseline files, e.g., security configuration files, etc), comparing the scan results file and (Continued)

SIMPLIFIED PAGE EXECUTION FLOWCHART baseline files, then generating customized POA&M outputs based on the user interface(s) and/or visualization system(s) inputs or selections.

2 Claims, 28 Drawing Sheets

Related U.S. Application Data

(60) Provisional application No. 62/377,863, filed on Aug. 22, 2016.

(51) Int. Cl.
*G06F 16/11* (2019.01)
*G06F 21/57* (2013.01)
*G06Q 10/00* (2012.01)

SIMPLIFIED MACHINE/SOFTWARE/NETWORK ARCHITECTURE

| FUNCTION NAME | INPUT | OUTPUT | DESCRIPTION |
|---|---|---|---|
| GeneratePOAM [20] | NONE | NONE | INITIALIZES PROGRAM DATA STRUCTURES |
| InitializeComponents [21] | NONE | NONE | INITIALIZES GRAPHICAL USER INTERFACE (GUI) COMPONENTS |
| GeneratePOAM_Load [22] | NONE | NONE | SETS MUST-HAVE DATA FROM EXTERNAL SOURCES |
| LoadSettings [23] | NONE | NONE | READS USER PREFERENCES FROM WINDOWS® REGISTRY INTO MEMORY |
| SetState [24] | STATE TO SET | NONE | ENABLES/DISABLES UI COMPONENTS BASED ON STATE |
| TemplateSelection_SelectedIndexChanged [25] | SELECTED TEMPLATE | NONE | ENABLES/DISABLES UI COMPONENTS BASED ON WHICH TEMPLATE IS SELECTED |
| ClearFiles [26] | NONE | NONE | ASKS THE USER FOR PERMISSION, CLEARS ALL FILES WAITING TO BE READ |
| AddButton_Click [27] | NONE | NONE | CONTEXTUALLY DETERMINES WHICH TYPE OF FILES TO REQUEST |
| AddFiles [28] | NONE | FILE LIST (FILTERED) | SETS UP FILE REQUEST, FILTERS INVALID FILES |
| UserSelectFiles [29] | TYPE OF FILE TO REQUEST | FILE LIST (UNFILTERED) | USES STANDARD WINDOWS COMPONENTS TO GET FILES FROM USER |
| CreatePOAMButton_Click [30] | BUTTON CLICKED | NONE | CLEARS RESULTS LIST, SETS OPERATING MODE TO CREATE NEW, SETS STATE TO DATA |
| BlankSheetButton_Click [31] | BUTTON CLICKED | NONE | USES STANDARD WINDOWS® COMPONENTS TO REQUEST POAM FILE NAME, CREATES EMPTY RESULTS LIST, RUNS SAVE PROCEDURE |
| ExecuteButton_Click [32] | BUTTON CLICKED | NONE | RETRIEVES ALL NECESSARY RESULTS OBJECTS AND FORWARDS THEM ON FOR WRITING THE EXCEL FILE |
| GetAllResults [33] | NONE | RESULT LIST (DEDEUPLICATED) OR RESULT LIST (MERGED) | USES READING FUNCTIONS TO GENERATE LIST OF RESULTS FOR WRITING TO POAM |

FUNCTION LIST

FIG. 3A

| FUNCTION NAME | INPUT | OUTPUT | DESCRIPTION |
|---|---|---|---|
| ReadFiles [34] | LIST OF FILES TO READ | RESULTS LIST (WITH DUPLICATES) | CALLS SERVICE-SPECIFIC LOAD FUNCTIONS TO READ FILES; CREATE LIST OF UNFILTERED DATA |
| LoadSCAP [35] | LIST OF FILES TO READ | SCAP RESULTS LIST | READS FILES INTO LIST OF RESULTS |
| LoadACAS [36] | LIST OF FILES TO READ | ACAS RESULTS LIST | READS FILES INTO LIST OF RESULTS |
| LoadFortify [37] | LIST OF FILES TO READ | ACAS RESULTS LIST | READS FILES INTO LIST OF RESULTS |
| LoadChecklist [38] | LIST OF FILES TO READ | ACAS RESULTS LIST | READS FILES INTO LIST OF RESULTS |
| ReadSpreadSheetv12 [39] | EXCEL WORKSHEET | RESULTS LIST (OLD) | READS SPREADSHEET AND PARSES DATA INTO RESULTS OBJECTS |
| MergeResults [40] | RESULTS LIST (UNFILTERED), RESULTS LIST (OLD) | RESULTS LIST (DEDUPLICATED) | REMOVES OR MERGES RESULTS WHICH ARE DUPLICATES |
| WriteExcelFile [41] | RESULTS LIST (DEDUPLICATED) | NONE | CALLS DATA WRITING ROUTINES, SAVES WORKBOOK TO FILE |
| SetupUSMCTemplate [42] | EXCEL WORKBOOK, RESULTS LIST (DEDUPLICATED) | EXCEL WORKBOOK OBJECT | CREATES SYSTEM LEVEL TEMPLATE IN EXCEL FORMAT, FILLS IN HEADER INFO, CALLS SUBROUTINE FOR FILLING IN RESULTS |
| SetupCRTemplate [43] | EXCEL WORKBOOK, RESULTS LIST (DEDUPLICATED) | EXCEL WORKBOOK OBJECT | CREATES CODE REVIEW TEMPLATE IN EXCEL FORMAT, FILLS IN HEADER INFO, CALLS SUBROUTINE FOR FILLING IN RESULTS |
| SetPOAMItems [44] | RESULTS LIST (DEDUPLICATED) | NONE | ADDS RESULTS ITEMS TO WORKBOOK |
| UpdatePOAMButton_Click [45] | BUTTON CLICKED | NONE | CLEARS RESULTS LIST, GETS ORIGINAL POAM FROM USER, SETS OPERATING MODE TO UPDATE |
| GetOriginalPOAM [46] | NONE | POAM FILE | USES STANDARD WINDOWS® COMPONENTS TO GET FILE FROM USER, DETERMINES TEMPLATE; LOADS RESULTS INTO MEMORY |
| GetTemplateOfPOAM [47] | POAM FILE | POAM TEMPLATE | DETERMINES POAM TEMPLATE BY PASSING FILE CONTENTS TO DETERMINISTIC FUNCTIONS |
| IsUSMCSheetv12 [48] | EXCEL WORKSHEET | TRUE OR FALSE | EXAMINES SHEET CONTENTS TO DETERMINE IF SHEET IS IN DOD IT SYSTEM SECURITY TEMPLATE |
| IsCodeReviewv11Sheetv12 [49] | EXCEL WORKSHEET | TRUE OR FALSE | EXAMINE SHEET CONTENTS TO DETERMINE IF SHEET IS IN CODE REVIEW TEMPLATE |

FIG. 3B  FUNCTION LIST (CONT.)

- FILE_LISTS - 101 - UNORDERED LIST OF SCANNING RESULTS FILES 13, SEPARATED BY TYPE
- SCAP_RESULTS - 103 - SEE FIG. 6A, CREATED BY READING IN SCANNING RESULTS FILES 13, WHICH WERE CREATED BY SCANNING SOFTWARE 12, E.G. SECURITY CONTENT AUTOMATION PROTOCOL (SCAP) SCANNERS
- ACAS_RESULTS - 105 - SEE FIG. 6B, CREATED BY READING IN SCANNING RESULTS FILES 13, WHICH WERE CREATED BY SCANNING SOFTWARE 12, E.G. ASSURED COMPLIANCE ASSESSMENT SOLUTION (ACAS) SCANNERS
- FORTIFY_RESULTS - 107 - SEE FIG. 6C, CREATED BY READING IN SCANNING RESULTS FILES 13, WHICH WERE CREATED BY SCANNING SOFTWARE 12, E.G. HPE FORTIFY SCANNERS
- CHECKLIST_RESULTS - 109 - SEE FIG. 6D, CREATED BY READING IN SCANNING RESULTS FILES 13, WHICH WERE CREATED BY SCANNING SOFTWARE 12, E.G. SECURITY TECHNICAL IMPLEMENTATION GUIDE (STIG) CHECKLIST SCANNERS
- RESULTS_LIST (EMPTY) - 111 - EMPTY LIST OF _RESULTS TYPES
- RESULTS_LIST (OLD) - 113 - LIST OF _RESULTS TYPES, READ FROM EXISTING POA&M DOCUMENT 14
- RESULTS_LIST (DEDUPLICATED) - 115 - LIST OF _RESULTS TYPES, WITHOUT DUPLICATES
- RESULTS_LIST (MERGED) - 117 - LIST OF _RESULTS TYPES, MERGED FROM RESULTS_LIST (OLD) 113 AND RESULTS_LIST (DEDUPLICATED) 115, MERGING ANY EQUIVALENT RESULTS TYPES

EXEMPLARY DATA STRUCTURES

FIG. 4A

| SCAP .xccdf (13, EXEMPLARY) XML XPath | PAGE SCAP_Results 103 DATA MEMBER | PAGE POA&M 14,15 OUTPUT COLUMN | |
|---|---|---|---|
| <Autocount> | Number | (Identifier Only) | 503A |
| cdf:Benchmark/cdf:Group/cdf:Rule[@severity] | CAT (Category) | B | 505A |
| cdf:Benchmark/cdf:Version | Source | J-1 | 521A |
| cdf:Benchmark/cdf:Group[@id] | SourceItem | J-2 | 521A |
| cdf:Benchmark/cdf:TestResult/cdf:rule-result[@idref] ("pass"="ERROR, "fail"="ONGOING") | Status | K | 523A |
| BLANK | Comments | L | 525A |
| cdf:Benchmark/cdf:Group/cdf:title | Title | A-1, M | 503A |
| cdf:Benchmark/cdf:Group/cdf:Rule/cdf:title | Description | A-2 | 503A |
| cdf:Benchmark/cdf:TestResult/cdf:target | DevicesAffected | A-3, N | 503A |
| BLANK | IA_Control | C, O | 507A |
| BLANK | POC | F | 513A |
| BLANK | Resources | G | 515A |
| BLANK | Completion | H | 517A |
| BLANK | Milestones | I-1 | 519A |
| BLANK | Changes | I-2 | 519A |
| <Date of Scan (from results file properties)> | Date | (Header Information) | 501A |
| <user input from Header Section> | ScanReason | J-3, T | 521A |
| <Date of Scan (from results file properties)> | UpdatedDate | J-4, U | 521A |
| cdf:Benchmark/cdf:Group/cdf:Rule/cdf:fixtext | FixText | V | |
| BLANK | RecommendedFix | W | |
| BLANK | Mitigation | E | 511A |
| BLANK | MitigationCAT | D | 509A |
| "SCAP" | ScanType | P | |

ALL OUTPUTS REFER TO THE EXCEL COLUMN LABEL
XPATH WILL GIVE RELATIVE XML PATH TO INNER STRING REPRESENTING A VALUE
[@] ITEMS WILL GIVE ATTRIBUTE STRING VALUES IN THE XPATH

DATA STRUCTURES (CONT.)

FIG. 4B

| ACAS.nessus (13, EXEMPLARY) XML XPath | PAGE ACAS_Results 105 DATA MEMBER | PAGE POA&M 14,15 OUTPUT COLUMN | |
|---|---|---|---|
| <Autocount> | Number | (Identifier only) | |
| NessusClientData_v2/Report/ReportHost/ReportItem[@severity] | CAT (Category) | B | —505A |
| "ACAS" | Source | J-1 | —521A |
| NessusClientData_v2/Report/ReportHost/ReportItem[@pluginID] | SourceItem | J-2 | —521A |
| "Ongoing" | Status | K | —523A |
| BLANK | Comments | L | —525A |
| NessusClientData_v2/Report/ReportHost/ReportItem[@pluginName] | Title | A-1, M | —503A |
| NessusClientData_v2/Report/ReportHost/ReportItem/Synopsis | Description | A-2 | —503A |
| NessusClientData_v2/Report/ReportHost[@name] | DevicesAffected | A-3, N | —503A |
| BLANK | IA_control | C, O | —507A |
| BLANK | Poc | F | —513A |
| BLANK | Resources | G | —515A |
| BLANK | Completion | H | —517A |
| BLANK | Milestones | I-1 | —519A |
| BLANK | Changes | I-2 | —519A |
| NessusClientData_v2/Report/ReportHost/ReportItem/HostProperties/tag[@name='HOST_END'] | Date | (Header Information) | —501A |
| <User input from Header Section> | ScanReason | J-3, T | —521A |
| BLANK | Solution | Not shown | |
| <Date of Scan (from results file properties)> | UpdatedDate | J-4, U | —521A |
| BLANK | FixText | V | |
| BLANK | RecommendedFix | W | |
| BLANK | Mitigation | E | —511A |
| BLANK | MitigationCAT | D | —509A |
| "ACAS" | ScanType | P | |

ALL OUTPUTS REFER TO THE EXCEL COLUMN LABEL
XPATH WILL GIVE RELATIVE XML PATH TO INNER STRING REPRESENTING A VALUE
[@] ITEMS WILL GIVE ATTRIBUTE STRING VALUES IN THE XPATH

DATA STRUCTURES (CONT.)

FIG. 4C

| FORTIFY (13, EXEMPLARY) XML XPath | PAGE FORTIFY_Results 107 DATA MEMBER | PAGE POA&M 14,15 OUTPUT COLUMN |
|---|---|---|
| */^[@iid] | Number | A |
| */^/../groupTitle | CAT (category) | NOT SHOWN |
| */Title[text()="Scan Information"]/../[2] | Source | K |
| */^/Primary/FilePath + */^/Primary/LineStart + */^/Category | SourceItem | C |
| "Ongoing" | Status | S |
| BLANK | Comments | R |
| */^/Category | Title | C |
| */^/Abstract | Description | D |
| */^/Primary/FilePath | DevicesAffected | B |
| BLANK | IA_Control | N/A |
| BLANK | POC | N/A |
| BLANK | Resources | N/A |
| BLANK | Completion | N/A |
| BLANK | Milestones | N/A |
| BLANK | Changes | N/A |
| <Date of Scan (from results file properties)> | Date | T |
| <User input from Header Section> | ScanReason | S |
| */Text[@"code base"] | ApplicationName | B |
| */^/Primary/FilePath + */^/Primary/LineStart + */^/Category | CodeReviewFinding | C |
| */^/Abstract | Abstract | D |
| */^/Kingdom | Category (Fortify) | E |
| */^/Friority | FortifyPriority | F |
| */^/ExternalCategory | STIG | G |
| BLANK | FalsePositive | H |
| BLANK | Justification | I |
| BLANK | Mitigation | J |
| */Title[text()="Scan Information"]/../[2] | CodeReviewSoftwareVersion | K |
| */^/ExternalCategory | STIFVersion | L |
| */Text[@"date"] | ScanDate | M |
| BLANK | ReleaseFound | N |
| BLANK | ReleaseFixed | O |
| BLANK | CompletionETA | P |
| "Fortify" | ScanType | N/A |

ALL OUTPUTS REFER TO THE EXCEL COLUMN LABEL
UNLESS OTHERWISE NOTED,"/" PATH WILL BE EQUIVALENT TO "ReportDefinition/ReportSection/SubSection/"
UNLESS OTHERWISE NOTED, "^" PATH WILL BE EQUIVALENT TO "IssueListing/Chart/GroupingSection/issue/"
"../" DENOTES A PARENT NODE, WHILE "[N]" DENOTES THE NUMBERED,N, CHILD OF THE PREVIOUS NODE

FIG. 4D   DATA STRUCTURES (CONT.)

| STIGViewer.ckl (13, EXEMPLARY) XML XPath (703D) | PAGE Checklist_Results 109 DATA MEMBER (701D) | PAGE POA&M 14,15 OUTPUT COLUMN (705D) | |
|---|---|---|---|
| <Autocount> | Number | (Identifier Only) | |
| */VULN_ATTRIBUTE[text()="Severity"]/../. | CAT (Category) | B | 505A |
| "STIG Viewer Checklist" | Source | J-1 | 521A |
| */ATTRIBUTE_DATA | SourceItem | J- | 521A |
| */STATUS | Status | K | 523A |
| */COMMENTS | Comments | L | 525A |
| */VULN_ATTRIBUTE[text()="Group_Title"]/../[1] | Title | A-1, M | 503A |
| */VULN_ATTRIBUTE[text()="Rule_Title"]/../[1] | Description | A-2 | 503A |
| STIGS/ASSET/HOST_IP | DevicesAffected | A-3, N | 503A |
| */VULN_ATTRIBUTE[text()="IA_Controls"]/../[1] | IA_Control | C, O | 507A |
| BLANK | POC | F | 513A |
| BLANK | Resources | G | 515A |
| BLANK | Completion | H | 517A |
| BLANK | Milestones | I-1 | 519A |
| BLANK | Changes | I-2 | 519A |
| <Date of Scan (from results file properties)> | Date | (Header Information) | 501A |
| <User input from Header Section> | ScanReason | J-3, T | 521A |
| <Date of Scan (from results file properties)> | UpdatedDate | J-4, U | 521A |
| */VULN_ATTRIBUTE[text()="Fix_Text"]/../[1] | FixText | V | |
| BLANK | RecommendedFix | W | |
| BLANK | Mitigation | E | 511A |
| BLANK | MitigationCAT | D | 509A |
| "Checklist" | ScanType | P | |
| */FINDING_DETAILS | FindingDetail | L | 525A |

ALL OUTPUTS REFER TO THE EXCEL COLUMN LABEL
"../" DENOTES A PARENT NODE, WHILE "·[N]/" DENOTES THE NUMBERED, N, CHILD OF THE PREVIOUS NODE, AND
"./" REPRESENTS THE FOLLOWING SIBLING NODE UNLESS OTHERWISE NOTED, "*/" WILL REPRESENT
"STIGS/ISTIG/VULN/STIG_DATA"

DATA STRUCTURES (CONT.)

FIG. 4E

- GeneratePOAM() [20]
  - InitializeComponent() [21]
- GeneratePOAM_Load() [22]
  - LoadSettings() [23]
  - SetState( STATE1_MODE ) [24]
- TemplateSelection_SelectedIndexChanged() [25]
  - ClearFiles() [26]
- AddButton_Click() [27]
  - AddFiles() [28]
    - UserSelectFiles ( FILE_TYPE ) [29]
  - SetState ( STATE3_READY ) [24]
- CreatePOAMButton_Click() [30]
  - SetState ( STATE2_DATA ) [24]
- BlankSheetButton_Click() [31]
  - WriteExcelFile( Result_List ) [41]
- ExecuteButton_Click() [32]
  - GetAllResults() [33]
    - ReadFiles ( File_List ) [34]
      - LoadSCAP ( SCAP_File_List ) [35]
      - LoadACAS ( ACAS_File_List ) [36]
      - LoadFortify ( Fortify_File_List ) [37]
      - LoadChecklist ( Checklist_File_List ) [38]
  - WriteExcelFile ( Results_List ) [41]
    - SetupUSMCTemplate ( Results_List ) [42] - OR - SetupCRTemplate ( Results_List ) [43]
    - SetPOAMItems ( Results_List ) [44]
  - SetState ( STATE1_MODE ) [24]

FUNCTION CALL HIERARCHY

FIG. 5

EXEMPLARY LOGICAL MODULES (COLLECTIONS OF FUNCTIONS) LIST

- InitializeUI [119]
  — Program.CS IS RUN (CODE APPENDIX LINE 6810)
  — Program.CS CALLS GeneratePOAM.CS (CODE APPENDIX LINE 6851)
  — GeneratePOAM.CS CONSTRUCTOR METHOD IS CALLED (CODE APPENDIX LINE 486-501)
  — GeneratePOAM CONSTRUCTOR METHOD CALLS InitializeComponents 21 (CODE APPENDIX LINE 488)
  OUTPUTS: UI IS SHOWN ON COMPUTER DISPLAY 3, INITIAL PROGRAM LOOP IS CREATED
  — GeneratePOAM.CS GeneratePOAM_Load METHOD 22 IS CALLED (CODE APPENDIX LINE 4568-4577)
  — GeneratePOAM_Load METHOD 22 CALLS LoadSettings 23 (CODE APPENDIX LINE 4572)
  — LoadSettings METHOD 23 LOADS ANY PREVIOUS SETTINGS FROM WINDOWS® REGISTRY, OR SETS VALUES TO DEFAULT IF NO PREVIOUS SETTINGS ARE FOUND, THEN RETURNS (CODE APPENDIX LINE 506-520)
  — GeneratePOAM_Load METHOD 22 CALLS SetState METHOD 24 TO SET STATE TO State1_Mode (CODE APPENDIX LINE 4576)
  OUTPUTS: SETTINGS LOADED, State1_Mode STATE SET

- ChangeTemplate [121]
  — GeneratePOAM.CS TemplateSelection_SelectedIndexChanged METHOD 25 (CODE APPENDIX LINE 4941-4977) IS CALLED
  — IF LOGICAL ReadScan MODULE 127 HAS BEEN RUN ALREADY AND SELECTION DOES NOT ALLOW SELECTED RESULTS, SELECTED RESULTS ARE CLEARED AFTER USER PROMPT
  OUTPUTS: "ADD" BUTTONS 409 ARE ENABLED OR DISABLED BASED ON TEMPLATE CHOSEN, E.G. 420 AND 440

- CreatePOAM [123]
  — CreatePOAM_Click METHOD 30 IS CALLED (CODE APPENDIX LINE 931-951)
  — Results_List 111 IS CLEARED IF ANY PREVIOUS ITEMS HAVE BEEN ENTERED (CODE APPENDIX LINE 942)
  OUTPUTS: PROGRAM STATE IS SET TO CreateNew, Results_List (EMPTY) 111, TEMPLATE HEADER FIELDS 411 ARE ENABLED

FIG. 6A

LOGICAL MODULES LIST (CONT.)

- CreateBlankPOAM [125]
  - GeneratePOAM.CS BlankSheetButton_Click METHOD 31 IS CALLED (CODE APPENDIX LINE 4898-4925)
  - BlankSheetButton_Click METHOD 31 CREATES A WINDOWS® SAVE FILE DIALOG (CODE APPENDIX LINE 4902)
  - USER SETS THE FILE SYSTEM LOCATION TO SAVE THE BLANK POA&M DOCUMENT IN .xlsx (EXCEL 2013) FORMAT (CODE APPENDIX LINE 4919)
  - BlankSheetButton_Click METHOD 31 CREATES Results_List (EMPTY) 111 (CODE APPENDIX LINE 4921)
  - BlankSheetButton_Click METHOD 31 RUNS LOGICAL WriteExcelFile MODULE 135 WITH Results_List (EMPTY) 111 AS A PARAMETER (CODE APPENDIX LINE 4921)
  - OUTPUTS: NONE, UNTIL LOGICAL WriteExcelFile 117 IS RAN

- ReadScan [127]
  - GeneratePOAM.CS METHOD AddButton_Click 27 (CODE APPENDIX LINE 563) IS CALLED
  - AddButton_click METHOD 27 CALLS AddFiles 28 (CODE APPENDIX LINE 571)
  - AddFiles METHOD 28 CALLS UserSelectFiles 29 (CODE APPENDIX LINE 582)
  - UserSelectFiles METHOD 29 DISPLAYS A WINDOWS® OPEN FILE DIALOG FOR THE USER TO CHOOSE APPROPRIATE RESULTS FILES 300 (CODE APPENDIX LINE 529)
  - ONCE FILES ARE CHOSEN, THE RESULTS FILE LIST IS RETURNED TO THE AddFiles METHOD 28 (CODE APPENDIX LINE 558)
  - RESULTS FILE LIST IS DEDUPLICATED AND SEPARATED BY RESULTS TYPE 300 (CODE APPENDIX LINE 592-635)
  - BASED ON TYPES OF RESULTS FILES IN RESULTS FILE LIST 101, OPTIONS ARE ENABLED 310 (CODE APPENDIX LINE 636)
  - "Create POAM" BUTTON 401 IS ENABLED IF THERE IS GREATER THAN ONE FILE IN THE ANY OF THE RESULTS FILE LISTS 101 (CODE APPENDIX LINE 639)
  - OUTPUTS: LISTS OF RESULTS FILES SEPARATED BY TYPE OF RESULTS (File_Lists 101)

- HeaderOptionsClassificationInput [129]
  - USER INPUTS TEXT FOR TEMPLATE HEADER FIELDS 411
  - USER CHECKS OPTIONS FIELDS 413
  - USER SELECTS OUTPUT CLASSIFICATION FROM CLASSIFICATION DROPDOWN 415
  - OUTPUTS: NONE, UNTIL LOGICAL ExecutePOAM MODULE 131 IS RUN

FIG. 6B

LOGICAL MODULES LIST (CONT.)

- ExecutePOAM [131]
  - GeneratePOAM.CS ExecuteButton_Click METHOD 32 (CODE APPENDIX LINE 4588) IS CALLED
  - ExecuteButton_Click METHOD 32 CALLS GetAllResults METHOD 33 (CODE APPENDIX LINE 4598)
  - GetAllResults METHOD 33 CREATES Results_List (EMPTY) 111 (CODE APPENDIX LINE 4690)
  - IF USER HAS NOT RUN LOGICAL MODULE ReadScan 127, PAGE PROGRAM ASKS USER IF THEY WANT TO RUN CreateBlankPOAM LOGICAL MODULE 125 TO CREATE A BLANK POA&M DOCUMENT (CODE APPENDIX LINE 4692-4710)
  - GetAllResults METHOD 33 CALLS ReadFiles METHOD 34 (CODE APPENDIX LINE 4713)
  - ReadFiles METHOD 34 CALLS LOAD<SERVICE> METHOD WITH File_Lists 101 AS PARAMETERS (CODE APPENDIX LINE 1031 1044)
    - LoadSCAP 35 (CODE APPENDIX LINE 2312)
    - OUTPUT: SCAP RESULTS ADDED TO Results_List (DEDUPLICATED) 115
    - LoadACAS 36 (CODE APPENDIX LINE 2449)
    - OUTPUT: ACAS RESULTS ADDED TO Results_List (DEDUPLICATED) 115
    - LoadFortify 37 (CODE APPENDIX LINE 2777)
    - OUTPUT: FORTIFY RESULTS ADDED TO Results_List (DEDUPLICATED) 115
    - LoadChecklist 38 (CODE APPENDIX LINE 3151)
    - OUTPUT: CHECKLIST RESULTS ADDED TO Results_List (DEDUPLICATED) 115
  - OUTPUT: Results_List (DEDUPLICATED) 115
  - GetAllResults METHOD 33 CHECKS Results_List (DEDUPLICATED) 115 TO SEE IF IT HAS MORE THAN ZERO ITEMS, AND IF NOT RETURNS Results_List (EMPTY) 111 (CODE APPENDIX LINE 4729)
  - OUTPUT: Results_List (DEDUPLICATED) 115 OR Results_List (EMPTY) 111
  - GetAllResults METHOD 33 SKIPS LOADING OLD RESULTS, AS THERE ARE NONE IN A NEW POA&M (CODE APP LINE 4680)
  - GetAllResults METHOD 33 RETURNS Results_List (DEDUPLICATED) 115 (CODE APPENDIX LINE 4681)
  - OUTPUT: Results_List (DEDUPLICATED) 115
  - ExecuteButton_Click METHOD 32 CREATES A WINDOWS ® SAVE FILE DIALOG (CODE APPENDIX LINE 4632)
  - THE USER SELECTS A FILE SYSTEM LOCATION TO SAVE THE POA&M DOCUMENT IN .xlsx (EXCEL 2013) FORMAT (CODE APP LINE 4632-4655)
  - ExecuteButton_Click METHOD 32 RUNS LOGICAL WriteExcelFile MODULE 135 WITH Results_List (DEDUPLICATED) 115 AS A PARAMETER (CODE APPENDIX LINE 4667)
  - OUTPUTS: NONE, UNTIL LOGICAL MODULE WriteExcelFile 135 IS RAN

FIG. 6C

- UpdatePOAM [133]
  - UpdatePOAMButton_Click METHOD 45 IS CALLED (CODE APPENDIX LINE 3648)
  - UpdatePOAMButton_Click 45 CALLS GetOriginalPOAM METHOD 46 (CODE APPENDIX LINE 3661)
  - GetOriginalPOAM 46 CREATES A WINDOWS® OPEN FILE DIALOG WHERE THE ORIGINAL POA&M IS CHOSEN
  - GetOriginalPOAM 46 RETURNS THE STRING TO UpdatePOAMButton_Click 45
  - UpdatePOAMButton_Click 45 CALLS GetTemplateOfPOAMFile 47 (CODE APPENDIX LINE 3691)
  - GetTemplateOfPOAMFile 47 LOADS THE ORIGINAL POA&M DOCUMENT 14 IN EXCEL FORMAT (.xlsx) (CODE APPENDIX LINES 3767-3775)
  - GetTemplateOfPOAMFile 47 THEN ATTEMPTS TO CATEGORIZE THE ORIGINAL POA&M DOCUMENT 14 AS ONE OF A KNOWN TEMPLATE IN A COLLECTION OF TEMPLATES, E.G., THREE TEMPLATES, BY CHECKING HEADER INFORMATION:
    - DoD IT SYSTEM SECURITY TEMPLATE, DECIDED BY CALLING isUSMCSheetv12 48 METHOD (CODE APPENDIX LINE 3718)
    - CODE REVIEW TEMPLATE, DECIDED BY CALLING isCodeReview11Sheetv12 49 (CODE APPENDIX LINES 3783-3784)
    - UNKNOWN TEMPLATE, DECIDED BY FALSE RETURNS FOR BOTH PREVIOUS TEMPLATES, WHICH THROWS AN ERROR
- OUTPUT: ORIGINAL POA&M DOCUMENT 14 LOADED INTO MEMORY, TEMPLATE TYPE LOADED INTO MEMORY

LOGICAL MODULES LIST (CONT.)

FIG. 6D

- WriteExcelFile [135]
  - WriteExcelFile METHOD 41 IS CALLED WITH Results_List (EMPTY) 111, Results_List (DEDUPLICATED) 115, OR Results_List (MERGED) 117 AS A PARAMETER (CODE APPENDIX LINE 1057-1156)
  - WriteExcelFile METHOD 41 CREATES A NEW ExcelPackage (CODE APPENDIX LINE 1077)
  - IF USER CHOSE <TEMPLATE> TEMPLATE, WriteExcelFile METHOD 41 CALLS Setup<TEMPLATE>Worksheetv12 WITH Results_List (EMPTY) 111, Results_List (DEDUPLICATED) 115, OR Results_List (MERGED) 117 AS A PARAMETER (CODE APPENDIX LINE 1092 OR 1107)
    - Setup<TEMPLATE>Worksheetv12 42 OR 43 WRITES EXCEL DOCUMENT SETTINGS, POA&M DOCUMENT TEMPLATE HEADER, POA&M DOCUMENT COLUMN HEADERS (CODE APPENDIX LINE 1474-1740 OR 1169-1377)
    - Setup<TEMPLATE>Worksheetv12 42 OR 43 THEN CALLS SetPOAMItems 44 WITH Results_List (EMPTY) 111, Results_List (DEDUPLICATED) 115, OR Results_List (MERGED) 117 AS A PARAMETER (CODE APPENDIX LINE 1741 OR 1378)
    - SetPOAMItems 44 ATTEMPTS TO LOOP THROUGH Results_List (EMPTY) 111, Results_List (DEDUPLICATED) 115, OR Results_List (MERGED) 117 (CODE APPENDIX LINE 3335-3544)
  - SetPOAMItems 44 POPULATES EXCEL FIELD VALUES ACCORDING TO THE APPROPRIATE DATA STRUCTURES (FIG. 5B-5E), AND RETURNS
  - Setup<TEMPLATE>Worksheetv12 42 OR 43 RETURNS
  - WriteExcelFile 41 THEN SAVES THE BLANK OR POPULATED POA&M DOCUMENT IN .xlsx (EXCEL 2013) FORMAT 14 OR 15
- OUTPUTS: UPDATED POA&M DOCUMENT 14 OR 15 (<TEMPLATE> template) IN .xlsx (EXCEL 2013) FORMAT
- OUTPUTS: PROGRAM IS SET TO State1_Mode

LOGICAL MODULES LIST (CONT.)

FIG. 6E

| LIST OF FILE INPUTS | DESCRIPTION |
|---|---|
| ACAS RESULTS | SCAN RESULTS ORIGINATING FROM THE ASSURED COMPLIANCE ASSESSMENT SOLUTION (ACAS); IN COMMA-SEPARATED-VALUES (CSV) OR EXTENSIBLE MARKUP LANGUAGE (XML) FORMAT |
| SCAP RESULTS | SCAN RESULTS FROM THE SECURE CONTENT AUTOMATION PROTOCOL SCANNER; IN XML FORMAT |
| STIGVIEWER CHECKLIST FILES | SECURE TECHNICAL IMPLEMENTATION GUIDE FINDINGS GENERATED MANUALLY WITH THE STIGViewer CHECKLIST; IN XML FORMAT (file extension .ckl) |
| CODE REVIEW RESULTS | CODE REVIEW RESULTS FROM HP FORTIFY SOFTWARE SECURITY CENTER; IN XML FORMAT |
| PENETRATION TEST RESULTS | NOT USED, LEFT AS A PLACEHOLDER FOR FUTURE IMPLEMENTATION |

FIG. 8

| POAM OPTIONS | DESCRIPTION |
|---|---|
| INCLUDE "NOT APPLICABLE" STIGViewer RESULTS | WHETHER OR NOT TO ADD TO THE POAM ITEMS FROM THE STIGViewer CHECKLIST SOURCE WHICH ARE CATEGORIZED AS "NOT APPLICABLE" |
| INCLUDE "NOT A FINDING" STIGViewer RESULTS | WHETHER OR NOT TO ADD TO THE POAM ITEMS FROM THE STIGViewer CHECKLIST SOURCE WHICH ARE CATEGORIZED AS "NOT A FINDING" |
| INCLUDE "NOT REVIEWED" STIGViewer RESULTS | WHETHER OR NOT TO ADD TO THE POAM ITEMS FROM THE STIGViewer CHECKLIST SOURCE WHICH ARE CATEGORIZED AS "NOT REVIEWED" |
| INCLUDE "INFORMATIONAL" ITEMS IN ACAS RESULTS | WHETHER OR NOT TO ADD TO THE POAM ITEMS FROM THE ACAS SOURCE WHICH ARE CATEGORIZED AS "INFORMATIONAL" (NOT SECURITY CONCERNS, THUS NOT ACTIONABLE) |

FIG. 9

EXEMPLARY GUI

EXEMPLARY GUI
FIG. 11

EXEMPLARY GUI
USMC Template
FIG. 12

SYSTEM LEVEL IT SECURITY POA&M

| Date Initiated: | 2/18/2016 | | | | IS TYPE: | N/A | | OMB Project ID: | | N/A |
|---|---|---|---|---|---|---|---|---|---|---|
| Date Last Updated: | 5/12/2016 | | | | POC Name: | Chris Parker | | | | |
| Component Name: | CERRT VM | | | | POC Phone: | 812-854-2998 | | Security Costs: | | N/A |
| System / Project Name: | TaCIT-UNCLAS | | | | POC Email: | christopher.a.parke2@nav.mil | | | | |
| DoD IT Registration No.: | N/A | | | | | | | | | |

| Weakness | Raw CAT | IA Control | Mitigated Cat | Mitigation | POC | Resources Required | Scheduled Completion Date | Milestone Changes | Source Identifying Weakness | Status | Comments |
|---|---|---|---|---|---|---|---|---|---|---|---|
| 503B | 505B | 507B | 509B | 511B | 513B | 515B | 517B | 519B | 521B | 523B | 525B |
| Title: Adobe Reader < 11.0.14 / 15.006.30119 / 15.010.20056 Multiple Vulnerabilities (APSB16-02) Description: The version of Adobe Reader installed on the remote Windows host is affected by multiple vulnerabilities. Devices Affected: 10.200.100.49 | CAT I | ECSC-1 | Cat II | install update | Chris Parker | | 5/20/2016 | | Assured Compliance Assessment Solution Nessus Plugin ID: 87918 Thu Feb 18 20:26:35 2016 | Ongoing | Severity: High Likelihood: |

501B

500

EXEMPLARY SYSTEM OUTPUT (SYSTEM LEVEL IT SECURITY POA&M OUTPUT)

FIG. 13

CODE REVIEW POA&M PROVIDED BY: NSWC CRANE

| | Project: | WebGoat 5.0 | Date of latest Code Review: | 04/04/2017 14:30 |
|---|---|---|---|---|
| | Project POC: | Justin Sargent | Code Review POC: | Chris Parker |
| Issue ID | Application/Module 605 | Code Review Finding 607 | Abstract 609 | Category 611 |
| 2032FFDA1 ACE66CF7B F814OFEDE F58A7 | WebGoat5.0 | JavaSource/org/owasp/webgoat/lessons/Buffer Overflow.java, line 59 (Password Management: Password in Comment) | Storing passwords or password details in plaintext anywhere in the system or system code may compromise system security in a way that cannot be easily remedied. | Security Features |
| 63FDA393 39AABEFFD AFC338CF3 882122 | WebGoat5.0 | JavaSource/org/owasp/webgoat/lessons/CrossS iteScripting/UpdateProfile.java, line 221 (Password Management: Password in Comment) | Storing passwords or password details in plaintext anywhere in the system or system code may compromise system security in a way that cannot be easily remedied. | Security Features |
| 63FDA393 39AABEFFD AFC338CF3 882125 | WebGoat5.0 | JavaSource/org/owasp/webgoat/lessons/RoleB asedAccessControl/DeleteProfile.java, line 136 (PasswordManagement: Password in Comment) | Storing passwords or password details in plaintext anywhere in the system or system code may compromise system security in a way that cannot be easily remedied. | Security Features |
| 3C852EAD 6AFD1D3F 62011629 3F79185D | WebGoat5.0 | JavaSource/org/owasp/webgoat/Lessons/XPATH Injection.java, line 79 (Password Management: Hardcoded Password) | Hardcoded passwords may compromise system security in a way that cannot be easily remedied. | Security Features |
| 4881C1A9E 2A09BF6D 6243B886 530CA78 | WebGoat5.0 | JavaSource/org/owasp/webgoat/lessons/SQLInj ection/ViewProfile.java, line 181 (Password Management: Password in Comment) | Storing passwords or password details in plaintext anywhere in the system or system code may compromise system security in a way that cannot be easily remedied. | Security Features |

CONTINUED IN FIG 14B

EXEMPLARY POA&M OUTPUT: CODE REVIEW

FIG. 14A

| Fortify Priority Explanation |
|---|
| • Critical - contains issues that have high impact and a high likelihood of occurring. Issues at this risk level are easy to discover and to exploit and represent the highest security risk to a program. |
| • High - contains issues that have a high impact and a low likelihood of occurring. High priority issues are often difficult to discover and exploit, but can result in much asset damage. They represent a significant security risk to the program. |
| • Medium - contains issues that have low impact and a high likelihood of exploitation. Medium priority issues are easy to discover and exploit but often result in little asset damage. They represent a moderate security risk to a program. |
| • Low - contains issues that have a low impact and low likelihood of exploitation. Low priority issues can be difficult to discover to exploit and typically results in little asset damage. These issues represent a minor security risk to the program. |

| Fortify Priority | STIG | False Positive (Y/N) | Justification for False Positive (if) | Mitigation | Code Review Software Version | STIG Version | Original Scan Date | Project Release Found | Project Release Fixed | Estimated Completion Date | Actual Completion Date | Comments |
|---|---|---|---|---|---|---|---|---|---|---|---|---|
| Low | N/A | | | | 6.42.0006 | N/A | Apr 7, 2016 | | | | | |
| Low | N/A | | | | 6.42.0006 | N/A | Apr 7, 2016 | | | | | |
| Low | N/A | | | | 6.42.0006 | N/A | Apr 7, 2016 | | | | | |
| Critical | N/A | | | | 6.42.0006 | N/A | Apr 7, 2016 | | | | | |
| Low | N/A | | | | 6.42.0006 | N/A | Apr 7, 2016 | | | | | |

CONTINUED FROM FIG. 14A (CONTINUATION OF 14A)

FIG. 14B

PLAN OF ACTION AND MILESTONES (POAANDM) AUTOMATED GENERATION ENGINE (PAGE) SYSTEM AND RELATED METHODS

CROSS-REFERENCE TO RELATED APPLICATIONS

The present application is a divisional of U.S. patent application Ser. No. 15/683,464, filed Aug. 22, 2017, entitled, "Plan of Action and Milestones (POA&M) Automated Generation Engine (PAGE) System and Related Methods" which claims priority to U.S. Provisional Patent Application Ser. No. 62/377,863, filed Aug. 22, 2016, entitled "Plan of Action & Milestone (POA&M) Automated Generation Engine (PAGE)," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200258U503) is assigned to the United States Government and is available for licensing for commercial purposes. Licensing and technical inquiries may be directed to the Technology Transfer Office, Naval Surface Warfare Center Crane, email: Cran_CTO@navy.mil.

BACKGROUND AND SUMMARY OF THE INVENTION

Various embodiments of the invention are directed to creating systems and processes associated with an expert system, user interfaces, visualizations, user selectable customization of different categories of POA&M templates, and generation and update/version control over POA&M documents which prevent a variety of errors and ensure various elements or components are included in different classes of activities and system outputs. These embodiments include a variety of POA&Ms enabling a variety of tasks and ensuring including software code reviews, security setting reviews, vulnerability reviews etc.

In one exemplary application, systems or methods associated with generating POA&Ms from code review reports encounter a variety of difficulties and challenges. For example, in order to create a POA&M from a given code review report, e.g., HP Fortify's code review reports, it was only possible to manually cut and paste all of the necessary information into a given system, e.g., a spreadsheet. In some examples, a process could have a baseline of being able to POA&M five thousand (5,000) issues in one week (40 hours). Because of the tedious, repetitive nature of the task, there was a significant degree of overhead and opportunity for error which automation, artificial intelligence (e.g., heuristics, etc), and other improvements could address.

Currently no known automation tool exists to enable rapid user customization and extraction of all needed information from a code review report to rapidly generate required POA&Ms in support of code reviews, vulnerability assessments, penetration assessments, etc, for various software applications and systems. Existing systems increasingly are vulnerable to human error in such POA&M creation efforts given analysis and production tasks are increasingly a Herculean task which is now beyond the cognitive and human factors limited capability of humans. Risks of a wide variety of errors from existing systems creates major security, financial, life, health, safety, and national security implications such to the point where humans in the loop can no longer be used. Existing systems create a tremendous failure points and unacceptable risk. Accordingly, improvements in automation systems, ability to manage complexity, visualizations, analytical design as well as processes associated with production of such analytics and POA&Ms is needed.

Generally, exemplary embodiments can include page systems that includes scanning systems configured to selectively scan networked target systems or computers to generate target system or computer configuration data for each target system or computer, one or more user interfaces for enabling selection of a problem or mission specific POA&M template from a POA&M template library and user selection of a range of output options associated with the template/problem or mission, and an expert system for generating the POA&M outputs based on user interface selections including selected POA&M template and POA&M data output selection rules that parse scanned system configuration data and populate POA&M template output files. In one set of exemplary applications, embodiments of exemplary automated code review plan of action and milestones (POA&M) using an exemplary plan of action & milestone generator engine (PAGE) system can receive, extract, and create user customizable outputs within template categories for particular classes or patterns of information from code review XML reports using, e.g., a code review, vulnerability assessment, and penetration assessment POA&M analytical framework and process. Embodiments of the invention dramatically reduce errors to include failure to identify a wide range or risks and errors. Embodiments of the invention also substantially speed accomplishment of analysis and creation a code review, vulnerability, and penetration POA&Ms such that analysis and production is now just a matter of minutes instead of days or weeks with attendant error risks. Structural or design aspects of PAGE system software source code also provide design aspects and structure that enable it to be adjusted to extract tailored or different information from a variety of different report to create a particular POA&M type as well.

In particular, embodiments of one or more exemplary PAGE system embodiments can create a tailored POA&M based on a selected type of code review report, e.g., HP Fortify's® source code reports, that are in a particular format, e.g., Extensible Markup Language (XML) format, which provide additional benefits such as improved information architecture and design for particular POA&M outputs. Embodiments of an exemplary PAGE system can incorporate vulnerability and penetration scanning results and then transform those results into a POA&M. Embodiments can also create elements for a POA&M by selectively retrieving information from the target format code reports, e.g., XML reports. Embodiments of the PAGE system can also create a POA&M from a single report or combine multiple reports into a single POA&M output as well as providing a system that generates a variety of customizable formats. PAGE system embodiments can also take a form of an executable program that is executed or run (not installed) on a system that stores selected code review reports, e.g., HP Fortify® code review reports. Embodiments can also create a formatted spreadsheet output and extract the selected information to populate POA&M document fields of interest associated with particular risk or needed capability or end state classes.

Embodiments may include source code for PAGE system examples which can be selectively altered via software design options to extract information from other types of reports that are in a particular format, e.g., XML format, to perform data analytics and extraction. Embodiments of an PAGE system and related methods could also be used outside of the Department of Defense (DoD) as a way to filter down the bulk of the code review reports by enabling the user to select the data that is relevant to a given situation such as risk sets, capability sets, or desired end state sets and generate outputs accordingly.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 3A shows an exemplary software function list in accordance with one embodiment of the invention;

FIG. 3B shows a continuation of the FIG. 3A function list in accordance with one embodiment of the invention;

FIG. 4A shows an exemplary list of data structures generated and used by an exemplary embodiment of the invention;

FIG. 4B shows a continuation of the FIG. 3A list of exemplary data structures used by an exemplary embodiment of the invention;

FIG. 4C shows a continuation of the FIGS. 3A and 3B lists of exemplary data structures used by an exemplary embodiment of the invention;

FIG. 4D shows a continuation of the FIGS. 3A, 3B, and 3C lists of exemplary data structures used by an exemplary embodiment of the invention;

FIG. 4E shows a continuation of the FIG. 3A-3D lists of exemplary data structures used by an exemplary embodiment of the invention;

FIG. 5 shows an exemplary list of a function call hierarchy in accordance with one embodiment of the invention;

FIG. 6A shows a simplified description of exemplary logical modules (collections of functions) in accordance with one embodiment of the invention;

FIG. 6B shows a continuation of descriptions of exemplary logical modules (collections of functions) in accordance with one embodiment of the invention;

FIG. 6C shows a continuation of descriptions of exemplary logical modules (collections of functions) in accordance with one embodiment of the invention;

FIG. 6D shows a continuation of descriptions of exemplary logical modules (collections of functions) in accordance with one embodiment of the invention;

FIG. 6E shows a continuation of descriptions of exemplary logical modules (collections of functions) in accordance with one embodiment of the invention;

FIG. 8 shows a list of exemplary file inputs and accompanying descriptions in accordance with one exemplary embodiment of the invention;

FIG. 9 shows a list of POA&M options in accordance with one exemplary embodiment of the invention;

FIG. 11 shows another exemplary GUI used with one exemplary embodiment of the invention;

FIG. 12 shows another exemplary GUI used with one exemplary embodiment of the invention;

FIG. 13 shows an exemplary POA&M format output, e.g., System Level information technology (IT) Security POA&M file, created by one exemplary embodiment of the invention;

FIG. 14A shows another exemplary POA&M and for a code review in accordance with another exemplary embodiment of the invention; and FIG. 14B shows a continuation of the FIG. 14A exemplary POA&M output.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
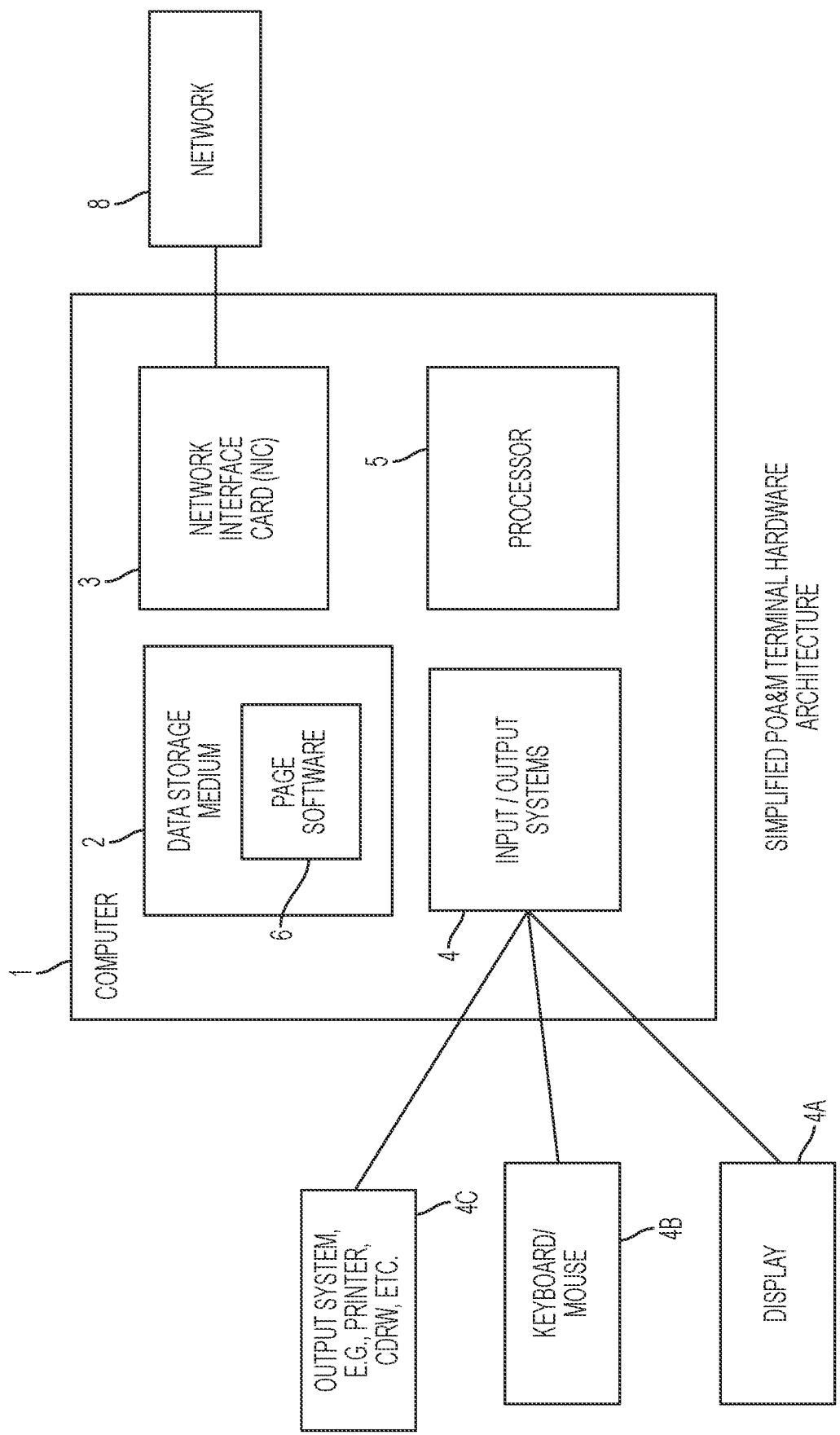
FIG. 1 shows an exemplary simplified hardware and software architecture for one embodiment of the invention with an exemplary PAGE software embodiment installed thereon.

Referring to FIG. 1, an exemplary simplified hardware and software architecture for one embodiment of the invention with an exemplary PAGE software embodiment installed thereon is shown. A computer 1 is provided with a data storage medium 2 (e.g. hard drive), machine readable instruction PAGE software 6 stored on the data storage medium 2, a processor 5 for executing the machine readable instruction PAGE software 6, input/output systems 4 that interfaces with a display 4A, a keyboard/mouse 4B, and an output system 4C (e.g., a printer, data output system such as a compact disk read/write (CDRW) system), and a network interface card (NIC) 3 which interfaces with a network 8.

Figure 2:
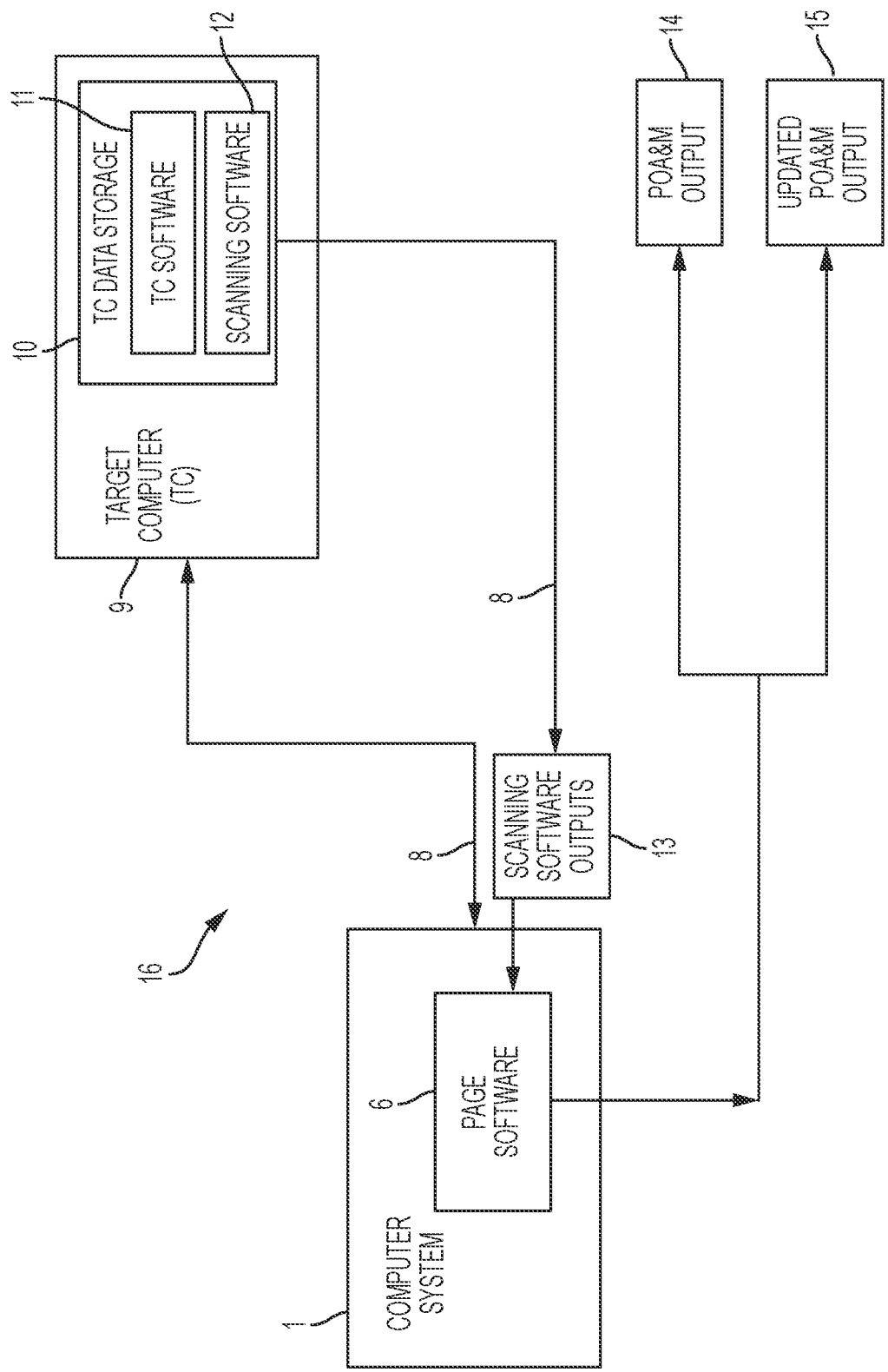
FIG. 2 shows an exemplary simplified machine, software, network architecture, and outputs for one embodiment of the invention.

FIG. 2 shows an exemplary simplified machine, software, network architecture, and outputs for one embodiment of the invention. The FIG. 1 system is provided including the computer 1 with the PAGE software 6 that is connected to at least one target computer (TC) 9 (in many embodiments, there are two or more TCs). The exemplary TC 9 can have a similar hardware architecture as the FIG. 1 computer system (e.g., processor, data storage, NIC, input/output systems, etc) connected by a network system 8. TC software 11 (e.g. operating system, application files, utility files, and other software programs and related files) is stored on the TC data storage system 10. In at least some embodiments, scanning software 12 is also stored on the TC data storage system 10. The scanning software 12 outputs scanning software outputs 13 which are communicated back to the PAGE software system 6 via network 8. The scanning software 12 can include tamper protected system embodiments that include a capacity to send encrypted data back to the PAGE software 6 by, e.g., SSL/TLS encrypted connection transfer. A user can perform a manual transfer of the scanning software outputs 13 or can use an automation system to transfer the scanning software output file 13. The PAGE software 6 outputs can include POA&M 14 and updated POA&M 15 outputs. In particular, TC 9 can include hardware and software including an operating system, e.g. Windows 7, or software item(s) with available source code which is scanned by scanning software 12. Scanning software 12 analyzes TC 9 software, e.g. Windows 7® Operating system, for security vulnerabilities and/or non-compliant setting items, e.g. missing patches, and produces detailed a scanning software output 13, e.g. Hewlett Packward Fortify code review results. Scanning software outputs 13 can include data saved in a specific file format, e.g. eXtensible Markup Language (XML) code review results data, that lists security vulnerabilities or non-compliant settings items in the target machine/software, e.g.: Security Content Automation Protocol (SCAP)—.xccdf XML file containing Security Technical Implementation Guide (STIG) compliance results; Assured Compliance Assessment Solution (ACAS)—.nessus XML file OR.csv Comma-Separated Value file, both containing security patch compliance results; HP Fortify® Automated Code Review—.xml XML file or HyperText Markup Language (HTML) file, both containing source code security compliance results; and STIG Viewer Checklist—.ckl XML file containing manually-applied STIG compliance results.

An embodiment of the PAGE system 6 can include computer program implemented methods, user interfaces, and functions to transform inputs, e.g. scanning software outputs 13, into outputs, e.g. Excel® documents in POA&M format. (e.g., see below)

For example, InitializeUI module 109 can be provided in PAGE program 107 that displays graphical user interface (GUI) on an exemplary computer screen (not shown), as well as initializes exemplary main data structures, e.g., Settings_List 111, Header_List 113, and Results_List 115, for first use by the PAGE 107 program. Another data structure can include Settings_List (Empty) 111 that can be an empty data structure that can contain settings data for use in determining filtering options for items in Results_List (Deduplicated) 133. Another data structure can include Header_List (Empty) 113 that can be an empty data structure that can contain user-input header data for configuring the Excel document's header information for the POA&M format. Another data structure can include Results_List (Empty) 115 that can include an empty data structure that can contain Result objects 117 with security compliance data parsed from Scan Result Files 105. Another data structure can include Result Object 117 that can include or encapsulates a data structure with internal implementation information, e.g. vulnerability identification number, representing an individual security vulnerability or non-compliant settings item found in the target machine/software 101, e.g. Windows 7® operating system, by scanning/security software 103, e.g. the ACAS scanning program.

FIG. 3A shows an exemplary software function list in accordance with one embodiment of the invention which summarizes functions or subroutines found in the code appendix to this application. GeneratePOAM 20 initializes program data structures. InitializeComponents 21 initializes GUI components. GeneratePOAM_Load 22 sets exemplary must-have data from external sources. LoadSettings 23 reads user preferences from Windows® Registry into memory. SetState 24 receives inputs including State to Set and enables/disables GUI components based on one or more specified states. States in this example indicates where exemplary page program elements are in execution such as, e.g., UI initialized state 1 associated with InitalizeUI 119 system output. TemplateSelection_SelectedIndexChanged 25 receives input including Selected Template that enables/disables GUI components based on which template is selected. ClearFiles 26 generates a request for user permissions and clears files waiting to be read. AddButton_Click 27 contextually determines which type of files to request. AddFiles 28 sets up file request(s), filters invalid files, and generates a filtered file list output. UserSelectFiles 29 receives a type of file to request, uses standard Windows components to get files from the user, then generates an unfiltered file list. CreatePOAMButton_Click 30 receives a button click, clears the results list, sets the operating mode to create new, and sets the state to data. BlankSheetButton_Click 31 receives a button click, uses standard Windows components to request a POAM file name, creates an empty Result list, and runs save procedure. ExecuteButton_Click 32 receives a button click then retrieves all necessary Results objects and forwards them on for writing to the excel file. GetAllResults 33 uses reading functions to generate a list of results to writing to the POAM and generates either a deduplicated results list or a merged results list.

FIG. 3B continues the exemplary function list started in FIG. 3A. ReadFiles 34 receives a list of files to read then calls service-specific load functions to read files, creates a list of unfiltered data, and generates a results list with duplicates. LoadSCAP 35 receives a list of files to read, reads the files into a list of results then generates a SCAP (Security Content Automation Protocol) results list. LoadACAS 36 receives a list of files to read, reads the files into a list of results then generates a ACAS (Assured Compliance Assessment Solution) results list. LoadFortify 37 also receives a list of files to read, reads the files into a list of results then generates a ACAS results list. LoadChecklist 38 also receives a list of files to read, reads the files into a list of results then generates a ACAS results list. ReadSpreadSheetv12 39 receives an Excel spreadsheet, reads the spreadsheet, and parses the data in Results objects, generating a Results list. MergeResults 40 receives either an unfiltered Results list or an old Results list and removes or merges Results which are duplicates, generating a deduplicated Results list. WriteExcelFile 41 receives a deduplicated Results list, calls data writing routines to write outputs to an output file (e.g., writing to a .xlsx file), and saves the Workbook to a file. SetupUSMCTemplace 42 receives an Excel Workbook and a deduplicated Results list, creates a system level template in Excel format, fills in header information, calls the subroutine for filling in Results, and generates an excel workbook object. SetupCRTTemplate 43 receives an Excel Workbook and a deduplicated Results list, creates a system level template in Excel format, fills in header information, calls the subroutine for filling in Results, and generates an excel workbook object. SetPOAMItems 44 receives a deduplicated results list then adds Results items to workbook. UpdatePOAMButton_Click 45 receives a button click, clears the Results list, gets the original POAM from a user, and sets the operating mode to Update. GetOriginalPOAM 46 uses standard Windows components to get a file from a user, determines the Template, loads the Results into memory, and generates a POAM file. GetTemplateOfPOAM 47 receives a POA&M file, determines the POA&M template by passing file contents to deterministic functions, and generates a POA&M template.

isUSMCSheetv12 48 receives an Excel Worksheet, examines the contents to determine if sheet is in a DoD IT System Security template and returns a true or false result. isCodeReviewv11Sheetv12 49 receives an Excel Worksheet, examines the contents to determine if the sheet is in Code Review template, and returns a true or false result.

FIG. 4A shows a list of exemplary data structures. Files_Lists 101 is made up of an unordered list of scanning results files 13 separated by type. SCAP_Results 103 (further exemplified in FIG. 6a) are created by reading in scanning results files 13, which were created by scanning software 12, e.g. Security Content Automation Protocol (SCAP) scanners. ACAS_Results 105 (further detailed in FIGS. 4A and 4C) are also created by reading in scanning results files 13, which were created by scanning software 12, e.g. Assured Compliance Assessment Solution (ACAS) scanners. Fortify_Results 107 (further exemplified in FIG. 6C) are created by reading in scanning results files 13, which were created by scanning software 12, e.g. HPE Fortify scanners. Checklist_Results 109 (further exemplified in FIG. 6D) are created by reading in scanning results files 13, which were created by scanning software 12, e.g. Security Technical Implementation Guide (STIG) Checklist scanners. Results_List (Empty) 111 is an empty list of _Results types. Results_List (Old) 113 is a list of Results types read from existing POA&M document 14. Results_List (Deduplication) 115 is a list of_Results types without duplicates. Results_List (Merged) 117 is a list of_Results types, merged from Results_List (Old) 113 and Results_List (Deduplicated) 115, merging any equivalent Results types.

FIG. 4B exemplifies the data structures resulting from a SCAP scanner. These data structures are given in column two, 'PAGE SCAP_Results 103 Data Member' 701A, and include: 'Number' 503A, 'CAT (Category)' 505A, 'Source' 521A, 'SourceItem' 521A, 'Status' 523A, 'Comments' 525A, 'Title' 503A, 'Description' 503A, 'DevicesAffected' 503A, 'IA_Control' 507A, 'POC' 513A, 'Resources' 515A, 'Completion' 517A, 'Milestones' 519A, 'Changes' 519A, 'Date' 501A, 'ScartReason' 521A, 'UpdatedDate', 521A, 'Mitigation' 511A, 'ScanType' 509A. Within this figure, column one, 'SCAP .xccdf (13, exemplary) XML Xpath' 703A, shows the relative XML path to an inner string representing a value. Column three, 'PAGE POA&M 14,15 Output Column' 705A, shows the corresponding column where that data structure, PAGE SCAP_Results 103 Data Member 701A, will be printed in the resulting POA&M document 14 or 15.

FIG. 4C exemplifies the data structures resulting from an ACAS scanner. These data structures are given in column two, 'PAGE ACAS_Results 105 Data Member' 701B, and include: 'CAT (Category)' 505A, 'Source' 521A, 'SourceItem' 521A, 'Status' 523A, 'Comments' 525A, 'Title' 503A, 'Description' 503A, 'DevicesAffected' 503A, 'IA_Control' 507A, 'POC' 513A, 'Resources' 515A, 'Completion' 517A, 'Milestones' 519A, 'Changes' 519A, 'Date' 501A, 'ScanReason' 521A, 'UpdatedDate' 521A, 'Mitigation' 511A, 'ScanType' 509A. Within this figure, column one, 'ACAS .nessus (13, exemplary) XML Xpath' 703B, shows the relative XML path to an inner string representing a value. Column three, 'PAGE POA&M 14,15 Output Column' 705B, shows the corresponding column where that data structure, PAGE ACAS_Results 103 Data Member 701B, will be printed in the resulting POA&M document 14 or 15.

FIG. 4D exemplifies the data structures resulting from a Fortify scanner. These data structures are given in column two, 'Fortify_Results 107 Data Member' 701C, and include: 'Number' 5029A, 'Source' 549A, 'SourceItem' 533A, 'Comments' 565A, 'Title' 533A, 'Description' 535A, 'DevicesAffected' 531A, 'Date' 563A, 'ScanReason' 565A, 'ApplicationName' 531A, 'CodeReviewFinding' 533A, 'Abstract' 535A, 'Category (Fortify)' 537A, 'FortifyPriority' 539A, 'STIG' 543A, 'FalsePositive' 545A, 'Justification' 547A, 'Mitigation' 549A, 'CodeReviewSoftwareVersion' 551A, 'STIGVersion' 553A, 'ScanDate' 555A, 'ReleaseFound' 557A, 'ReleaseFixed' 559A, 'CompletionETA' 561A. Within this figure, column one, 'Fortify (13, exemplary) XML Xpath' 703C, shows the relative XML path to an inner string representing a value. Column three, 'PAGE POA&M 14,15 Output Column' 705C, shows the corresponding column where that data structure, Fortify_Results 103 Data Member 701C, will be printed in the resulting POA&M document 14 or 15.

FIG. 4E exemplifies the data structures resulting from a STIGViewer scanner. These data structures are given in column two, 'PAGE Checklist_Results 109 Data Member' 701D, and include: 'CAT (Category)' 505A, 'Source' 521A, 'SourceItem' 521A, 'Status' 523A, 'Comments' 525A, 'Title' 503A, 'Description' 503A, 'DevicesAffected' 503A, 'IA_Control' 507A, 'POC' 513A, 'Resources' 515A, 'Completion' 517A, 'Milestones' 519A, 'Changes' 519A, 'Date' 501A, 'ScanReason' 521A, 'UpdatedDate' 521A, 'Mitigation' 511A, 'Mitigation CAT' 509A, 'FindingDetails' 525A. Within this figure, column one, 'STIGViewer .ckl (13, exemplary) XML Xpath' 703D, shows the relative XML path to an inner string representing a value. Column three, 'PAGE POA&M 14,15 Output Column' 705D, shows the corresponding column where that data structure, PAGE Checklist_Results 103 Data Member 701D, will be printed in the resulting POA&M document 14 or 15.

FIG. 5 shows an exemplary function call hierarchy. The GeneratePOAM( )21 function calls the InitializedComponent( )21 function. GeneratePOAM_Load( )22 calls both the LoadSetting( )23 and SetState (STATE1_MODE) 24 functions. TemplateSeleection_SelectedIndexChanged( )25 calls ClearFiles( )26. AddButton_Click( )27 calls (1) AddFile ( )28, which calls UserSelectFiles (FILE_TYPE) 29, and (2) SetState (STATE3READY) 24. CreatePOAMButton_Click ( )30 calls SetState (STATE2_DATA) 24. BlankSheetButton_Click( )31 calls WriteExcelFile (Result_List) 41. ExecuteButton_Click( )32 calls (1) GetAllResults( )33, which calls ReadFiles (Files_List) 34, which in turn calls (a) LoadSCAP (SCAP_File_List) 35, (b) LoadACAS (ACAS_File_List) 36, (c) LoadFortify (Fortify_File_List) 37, and (d) LoadChecklist (Checklist_File_List) 38; (2) WriteExcelFile (Results_List) 41, which calls (a) either SetupUSMCTemplate (Results_List) 42 or SetupCRTTemplate (Results_List) 43, and (b) SetPOAMItems (Results_List) 44; and (3) SetState (STATE1 MODE) 24.

Several functions can be combined into logical modules. FIG. 6A shows a list of exemplary logical modules. InitializeIU 119 causes Program.CS to run, which in turn calls GeneratePOAM.CS. The GeneratePOAM.CS constructor method is called, which in turn calls InitializeComponents 21. At this point a UI is output and showns on computer display 3 and an initial program loop is created. GeneratePOAM.CS GeneratePOAM_Load method 22 is called. GeneratePOAM_Load method 22 calls LoadSettings 23, which loads any previous settings from Windows Registry, or sets values to default if not previous settings are found, then returns. GeneratePOAM_Load method 22 calls SetState method 24 to set state to State1_Mode. Exemplary final output loads the settings and the State1_Mode state is set. The ChangeTemplate 121 module states by calling the GeneratePOAM.CS TemplateSelection_SelectedIndexChanged method 25. If logical ReadScan module 127 has been run already and selection does not allow selected results, selected results are cleared after a user prompt. The output of this module is to enable or disable "Add" buttons based on the chosen template, e.g. 420 and 440. CreatePOAM 123 calls CreatePOAM Click method 30 and clears Results_List 111 is any previous items have been entered. The output of this modules is to set program state to CreateNew, Results_List (Empty) 111 and enable Template Header Fields 411.

FIG. 6B continues the list of exemplary logical modules. The module CreateBlankPOAM 125 first calls GeneratePOAM.CS BlankSheetButton_Click method 31. BlankSheetButton_Click method 31 creates a Windows Save File Dialog. The user sets the file system locations to save the blank POA&M document in .xlsx (Excel 2013) format. BlankSheetButton_Click method 31 creates Results_List (Empty) 111 and finally runs logical WriteExcelFile module 135 with Results_List (Empty) 111 as a parameter. This module doesn't output anything until logical WriteExcelFile 117 is ran. The module ReadScan 127 starts by calling the GeneratePOAM.CS method AddButton_Click 27. AddButton_Click 27 calls AddFiles 28, which in turn calls UserSelectFiles 29. UserSelectFiles 29 displays a Windows Open File Dialog for the user to choose appropriate results files 300. Once the files are chosen, the results files list is returned to the AddFiles method 28. Results files list is deduplicated and separated by results type 300. Based on types of results files in results file list 101, options are enabled 310. If there is greater than one file in any of the results file lists 101, the "Create POAM" button 401 is enable. Finally, this outputs lists of results files separated by type of results (File_Lists 101). The module HeaderOptionsClassificationInput 129 takes user input text for Template Header field 411, the user then checks Options fields 413 and selects output classification from Classification dropdown 415. There is no output from this module until logical ExecutePOAM module 131 is run.

FIG. 6C discusses exemplary aspects of ExecutePOAM 131 module. First the GeneratePOAM.CS ExecuteButton_Click method 32 is called, which in turn calls the GetAllResults method 33. GetAllResults method 33 creates Results_List (Empty) 111. If the user has not run logical module ReadScan 127, PAGE program asks user if they want to run CreateBlankPOAM logical module 125 to create a blank POA&M document. GetAllResults method 33 calls ReadFiles method 34. ReadFiles method 34 calls Load <SERVICE> method with File_Lists 101 as parameters. The Load<SERVICE> method can be one of four options: (1) LoadSCAP 35, which outputs SCAP results added to Results_List (Deduplicated) 115; (2) LoadACAS 36 which outputs ACAS results added to Results_List (Deduplicated) 115; (3) LoadFortify 37, which outputs Fortify results added to Results_List (Deduplicated) 115; (4) LoadChecklist 38, which outputs Checklist Results added to Results_List (Deduplicated) 115. After that output, the GetAllResults method 33 checks Results_List (Deduplicated) 115 to see if it has more than zero items, and if not outputs Results_List (Empty) 111. GetAllResults method 33 skips loading old results, as there are none in a new POA&M, and outputs Results_List (Deduplicated) 115. ExecuteButton_Click method 32 creates a Windows Save File Dialog. The user selects a file system location to save the POA&M documents in .xlsx (Excel 2013) format. ExecuteButton_Click method 32 runs logical WriteExcelFile module 135 with Results_List (Deduplicated) 115 as a parament. This module outputs nothing at the end until logical module WriteExcelFile 135 is ran.

FIG. 6D discusses exemplary aspects of the logical module UpdatePOAM 133. First, UpdatePOAMButton_Click method 45 is called, which in turn calls GetOriginalPOAM method 46. GetOriginalPOAM method 46 creates a Windows Open File Dialog where the Original POA&M is chosen. GetOriginalPOAM 46 returns the filepath string to UpdatePOAMButton_Click 45, which calls GetTemplateOfPOAMFile 47. GetTemplateOfPOAMFile 47 loads the Original POA&M document 14 in Excel format (.xlsx) then attempts to categorize to categorize the Original POA&M document 14 as one of a number of templates, e.g., three templates, by checking header information. These exemplary templates can include: (1) DoD IT System Security template, decided by calling isUSMCSheetv12 48 method; (2) Code Review template, decided by calling isCodeReviewv11Sheetv12 49; (3) Unknown template, decided by false returns for both previous template, which throws an error. The output of this method is to load the Original POA&M document 14 and the template type into memory.

FIG. 6E discusses aspects of the exemplary WriteExcelFile 135 logical module. First, WriteExcelFile method 41 is called, along with Results_List (Empty) 111, Results_List (Deduplicated) 115, or Results_List (Merged) 117 as a parameter. WriteExcelFile method 41 creates a new ExcelPackage. If User chose <TEMPLATE> template, WriteExcelFile method 41 calls Setup<TEMPLATE>Worksheetv12 with Results_List (Empty) 111, Results_List (Deduplicated) 115, or Results_List (Merged) 117 as a parameter. Setup<TEMPLATE>Worksheetv12 42 OR 43 writes Excel document settings, POA&M document template header, POA&M document column headers. Setup <TEMPLATE>Worksheetv12 42 Or 43 then calls SetPOAMItems 44 with Results_List (Empty) 111, Results_List (Deduplicated) 115, or Result_List (Merged) 117 as a parameter. SetPOAMItems 44 attempts to loop through Results_List (Empty) 111, Results_List (Deduplicated) 115, or Results_List (Merged) 117. SetPOAMItems 44 populates Excel field values according to the appropriate Data Structures (FIG. 5B-5E), and returns Setup <TEMPLATE>Worksheetv12 42 or 43. WriteExcelFile 41 then saves the blank or populated POA&M document in .xlsx (Excel 2013) format 14 Or 15. This module outputs an updated POA&M document 14 or 15 (<TEMPLATE>template) in .xlsx (Excel 2013) format and sets the program to State1_Mode.

Figure 7A:
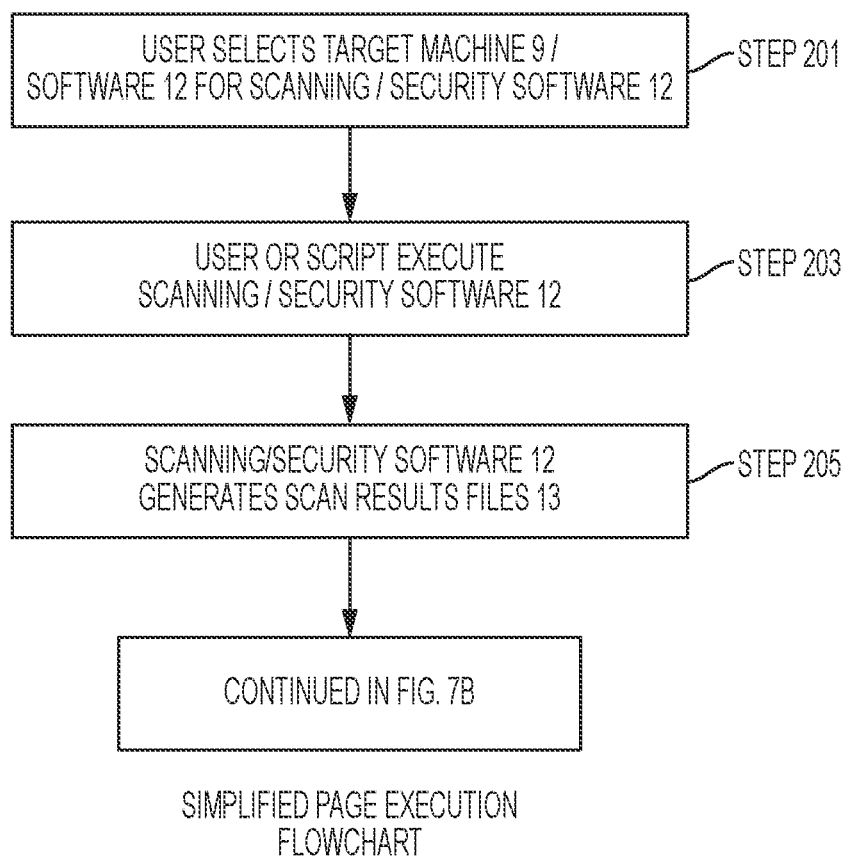
FIG. 7A shows a simplified PAGE execution flowchart in accordance with one exemplary embodiment of the invention.

FIG. 7A shows the beginning of a simplified PAGE execution flowchart. In the first step (201) the user selects a target machine 9 or software 12 for scanning or security software 12. Next (203) the user or script executes scanning or security software 12. Next (205) the scanning or security software 12 generates scan results files 13.

Figure 7B:
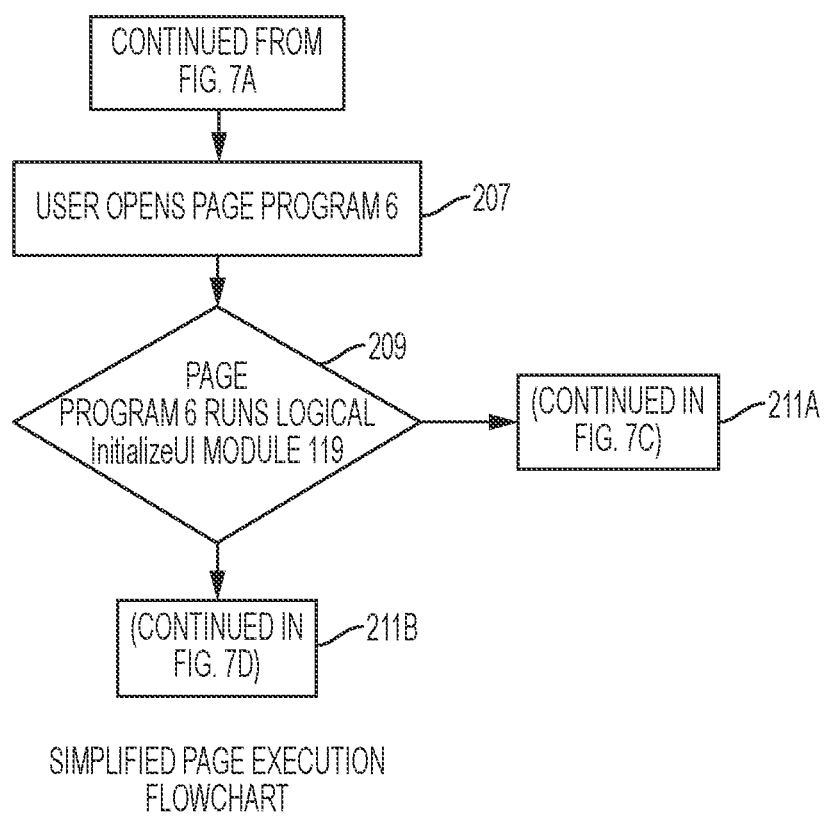
FIG. 7B shows a continuation of the FIG. 7A exemplary execution flowchart.

FIG. 7B continues the simplified flowchart that was started in FIG. 7A. The user opens PAGE program 6 (207). Next (209), the PAGE program 6 runs logical InitializeUI module 119. The next concurrent parts of the program are illustrated in FIGS. 7C (211A) & 7D (211B).

Figure 7C:
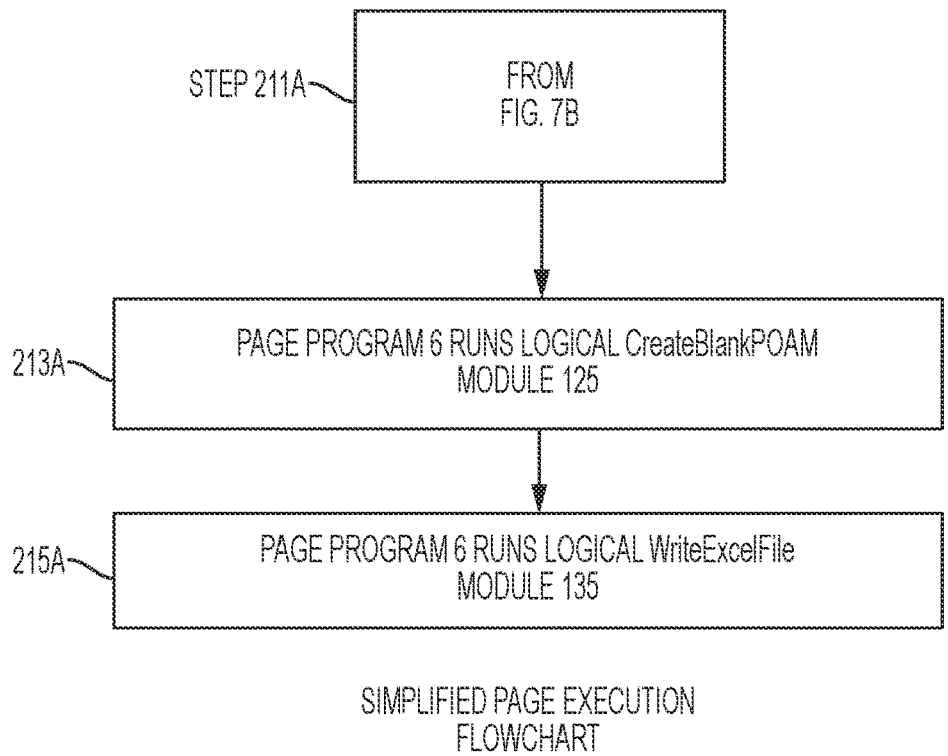
FIG. 7C shows a continuation of the FIGS. 7A and 7B exemplary execution flowcharts.

FIG. 7C continues the simplified flowchart. PAGE program 6 runs logical CreateBlankPOAM module 125 (213A). Finally, (215A) PAGE program 6 runs logical WriteExcelFile module 135.

Figure 7D:
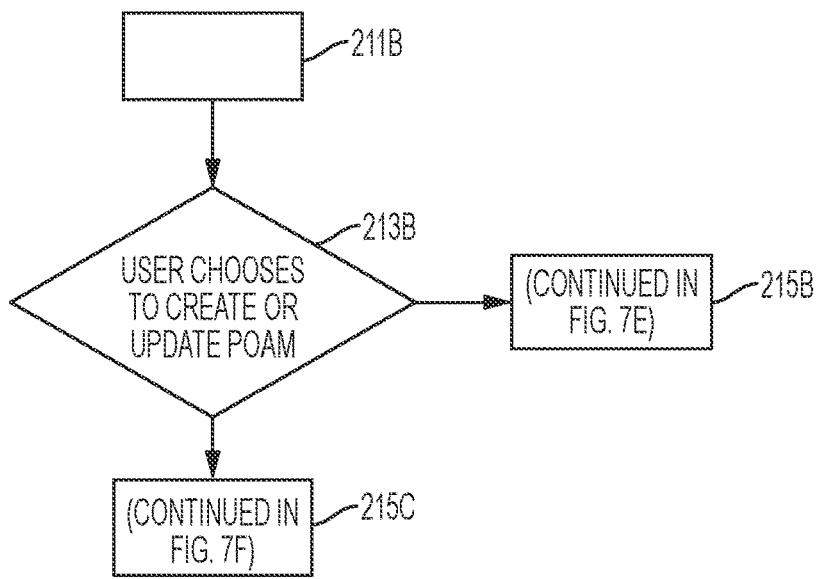
FIG. 7D shows a continuation of the FIGS. 7A-7C exemplary execution flowcharts.

FIG. 7D continues the simplified flowchart from FIG. 7B (211B) and occurs while the steps in FIG. 7C occur. The user chooses to create or update POA&M. If they choose to create a POA&M, they move to 215B (continued in FIG. 7E). If they choose to update a POA&M, they move to 215C (continued in FIG. 7F).

Figure 7E:
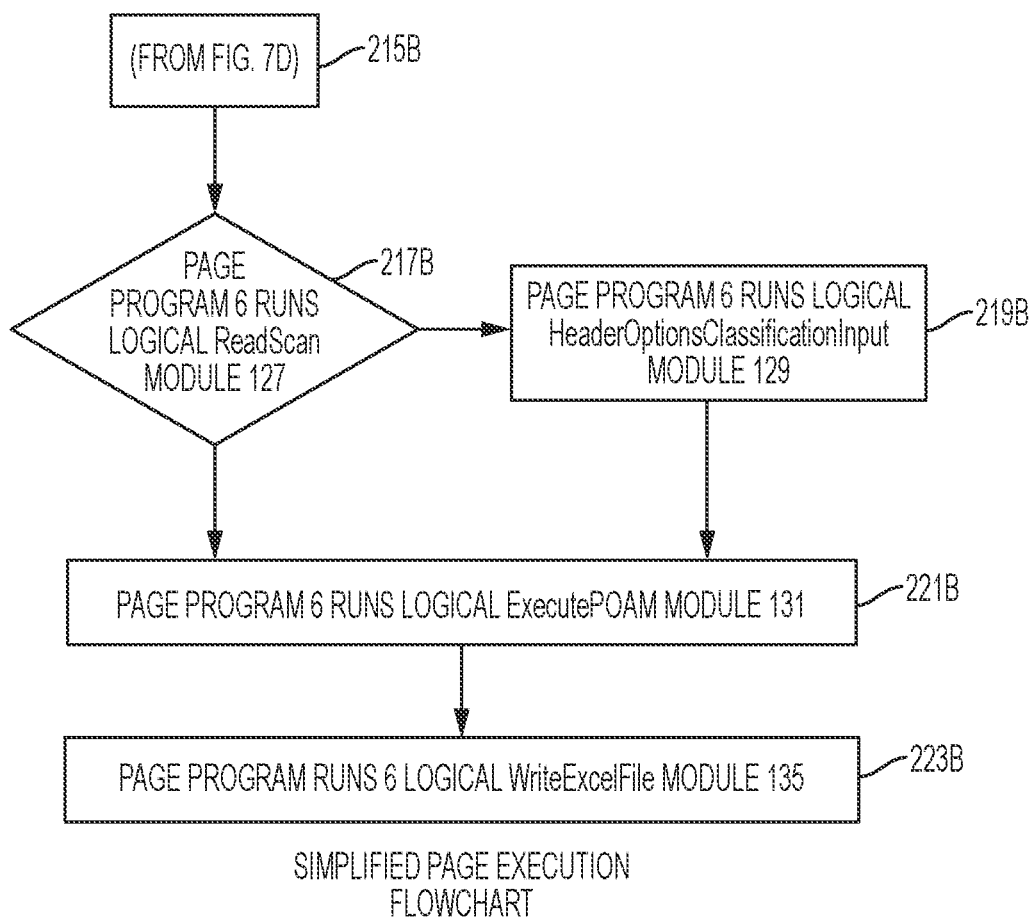
FIG. 7E shows a continuation of the FIGS. 7A-7D exemplary execution flowchart.

FIG. 7E shows the simplified flowchart if the user chooses to create a POA&M (215B). PAGE program runs logical ReadScan module 127 (217B). Next (219B), PAGE program 6 runs logical HeaderOptionsClassificationInput module 129. Then (221B), PAGE program 6 runs logical ExecutePOAM module 131. Finally (223B), PAGE program 6 runs logical WriteExcelFile module 135.

Figure 7F:
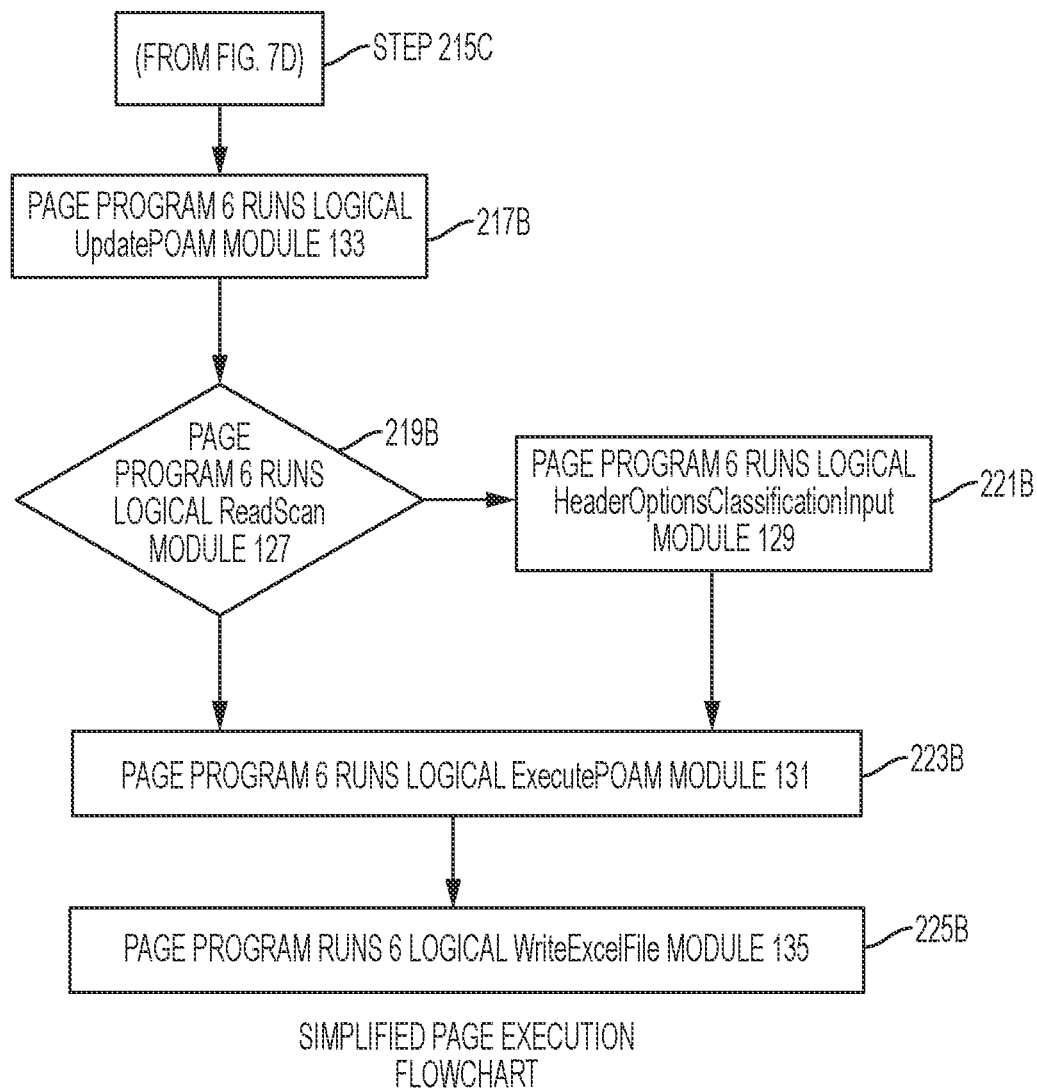
FIG. 7F shows a continuation of the FIGS. 7A-7E exemplary execution flowchart.

FIG. 7F shows the simplified PAGE execution flowchart if the user chooses to update the POA&M (215C). PAGE program 6 runs logical UpdatePOAM module 133 (217B). Next (219B), PAGE program 6 runs logical ReadScan module 127. Then (221B), PAGE program 6 runs logical ExecutePOAM module 131. Finally (223B), PAGE program 6 runs logical WriteExcelFile module 135.

FIG. 8 Shows a list of possible file inputs 300 for one embodiment of the invention and a description of each input. ACAS Results 301 are scan results originating from the Assured Compliance Assessment Solution (ACAS), in either Comma-Separated-Values (CSV) or eXtensible Markup Language (XML) format. SCAP Results 303 are scan results from the SCAP scanner, in XML format. STIGViewer Checklist File 305 are Security Technical Implementation Guide findings generated manually with the STIGViewer Checklist in XML format, with a .ckl file extension. Code Review Results 307 are scan results from the HP Fortify Software Security Center in XML format. Penetration Test Results 309 are not used and a simply left as a placeholder for future implementation.

FIG. 9 shows a list of POA&M options in accordance with one exemplary embodiment of the invention. "Include 'Not Applicable' STIGViewer Results" 311 determines whether or not to add to the POA&M items from the STIGViewer Checklist source which are categorized as "not applicable." "Include 'Not a Finding' STIGViewer Results" 313 determines w Whether or not to add to the POA&M items from the STIGViewer Checklist source which are categorized as "not a finding." "Include Not Reviewed" STIGViewer Results' 315 determines whether or not to add to the POA&M items from the STIGViewer Checklist source which are categorized as "not reviewed." "Include 'Informational' items in ACAS Results" 317 determines whether or not to add to the POA&M items from the ACAS source which are categorized as "Informational" (not security concerns, thus not actionable).

Figure 10:
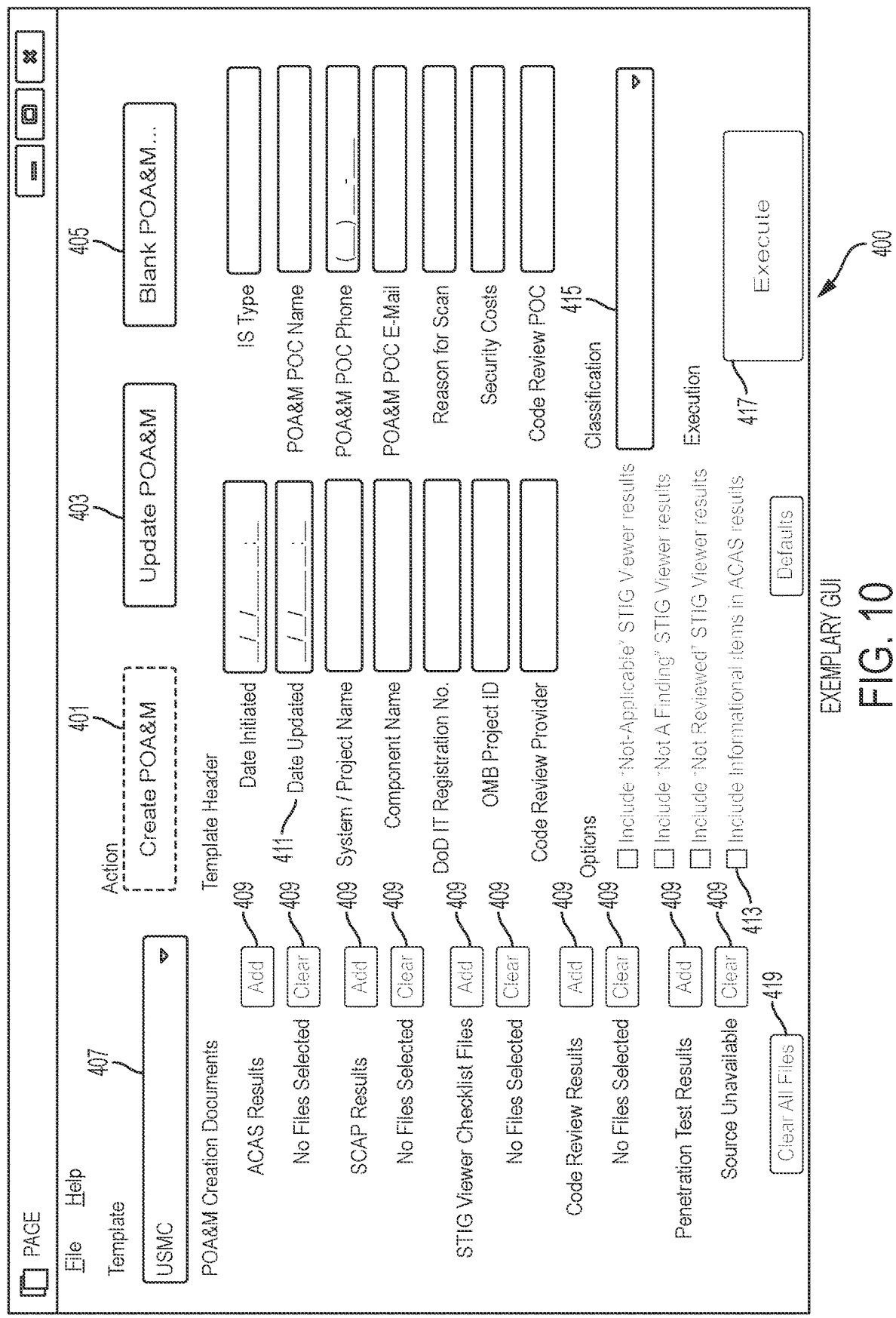
FIG. 10 shows an exemplary graphical user interface (GUI) used with one exemplary embodiment of the invention.

FIG. 10 shows an exemplary graphical user interface (GUI) 400 used with one exemplary embodiment of the invention. A Template Dropdown Menu 407 allows for selection of a specific formatting to use when formatting an Excel document into a predetermined or selected POA&M format, e.g. USMC specified POA&M format. Open File Dialog element 409 provides a program dialog for choosing Scan Software Outputs 13 to load into the PAGE program 6. Each "Add" button will open specific types of files only, e.g. ACAS .nessus files. "Clear" buttons 419 provides a command button that can clear any added Scan Software Outputs 13 that have been loaded into PAGE program 6. A series of command buttons (Create POA&M 401, Update POA&M 403, and Blank POA&M 405) allow a user to initialize corresponding logical modules (CreatePOAM 123, UpdatePOAM 133, and CreateBlankPOAM 125, respectively). User-input for Header Information 411 can include user input fields for information needed to populate an exemplary Header 501 (See FIG. 13) of the selected POA&M Format (eg., See FIG. 13). Options 413 for user-selected filtering of Results_List 113 can provide a graphical construct providing user-selected options for filtering Result objects 14 or 15 from the Results_List 113 before outputting such objects to the POA&M outputted document 14. An execution command button 417 allows the user to implement exemplary logical ExecutePOAM module 131.

Figure 11:
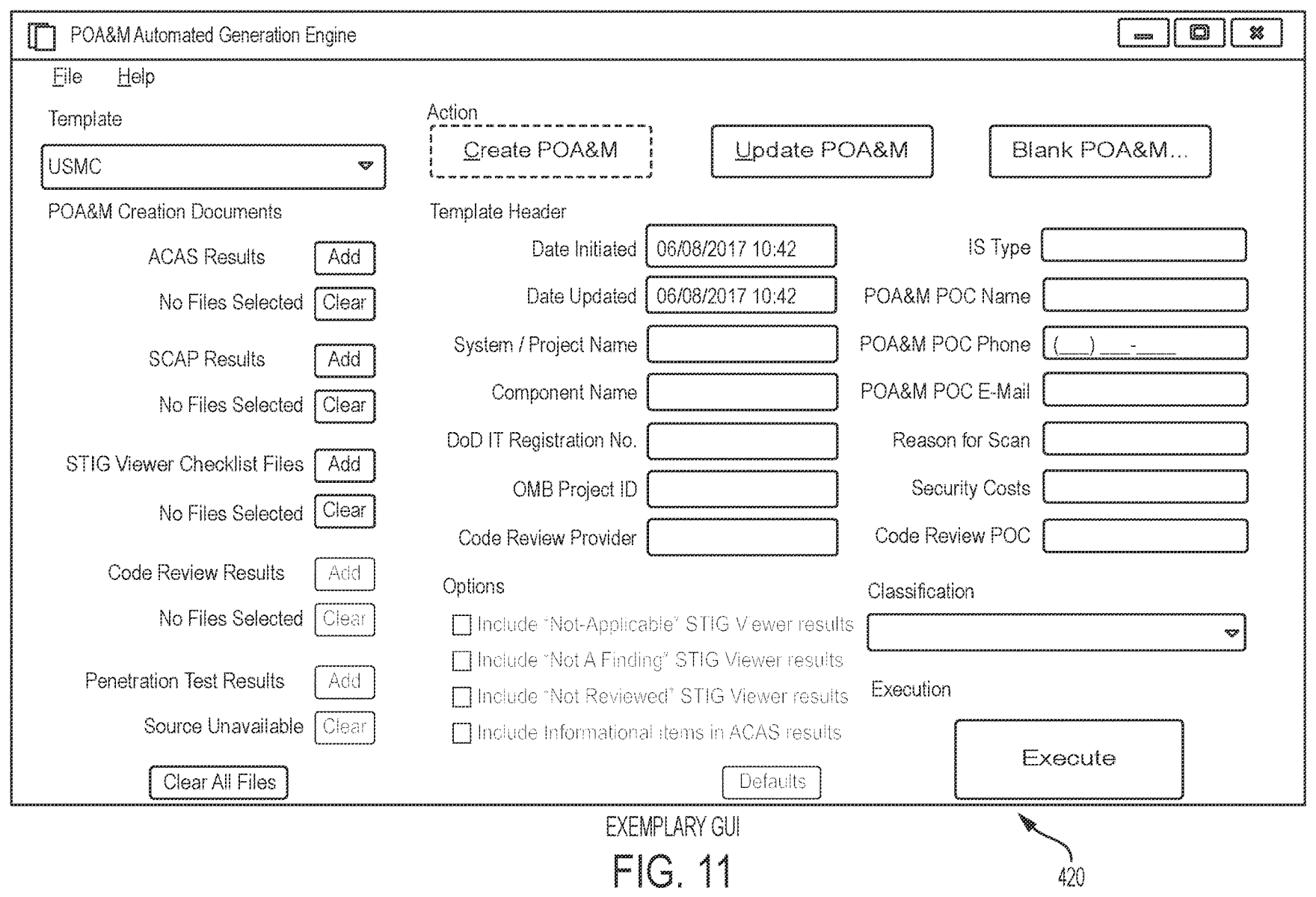

FIG. 11 shows an exemplary GUI using the USMC template.

Figure 12:
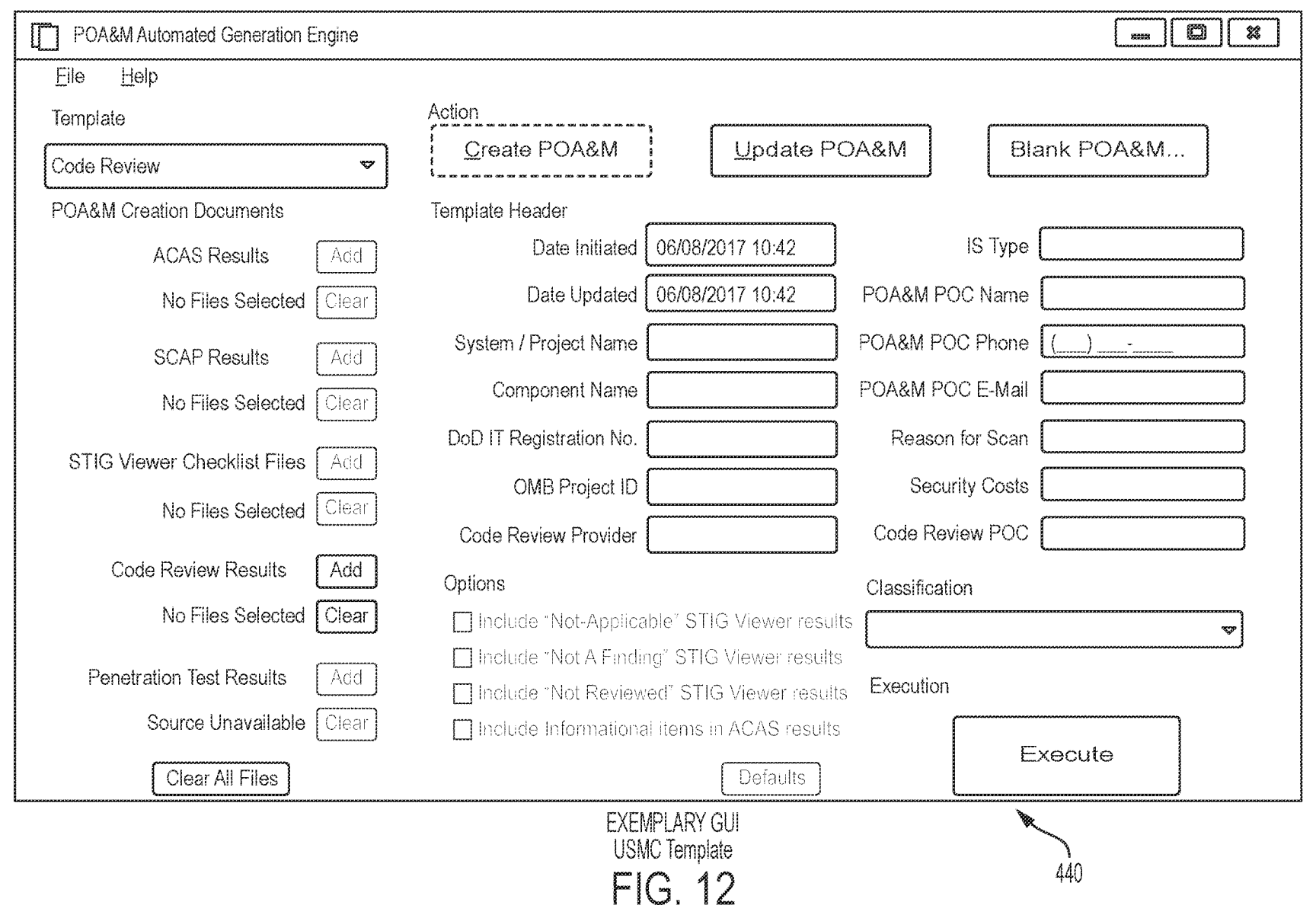

FIG. 12 Shows a second state exemplary GUI, demonstrating the code Review template.

Referring to FIG. 13, an exemplary POA&M format output is shown, e.g., System Level IT Security POA&M file. In this embodiment, Header Information for POA&M Format 501 can be an exemplary formatting for the header area of the Excel document in POA&M format 14 or 15, which can be written with user-input information gathered from a data structure. Also in this embodiment, a first column, e.g. labelled 'Weakness' 503, can be output with information identifying a reference security non-compliance item by name or ID, short description, and identification of an exemplary target machine/software 11, e.g. Windows 7, of which that security non-compliance item belongs. Also in this embodiment, a second column, e.g. labelled 'Raw CAT' 505, can be output with an identifier for the severity of a reference security non-compliance item, or a potential risk to an exemplary target machine/software if that security non-compliance item was not brought into a state of compliance. Also in this embodiment, a third column, e.g. labelled 'IA Control' 507, can be output with an identifier for an ID defined in the Risk Management Framework (RMF) for identifying classes of security non-compliance items, e.g. an Information Assurance (IA) Control. Also in this embodiment, a fourth column, e.g. labelled 'Mitigated CAT' 509, can be output with an identifier for an exemplary severity of a reference security non-compliance item after it has had a mitigation, or a workaround not falling directly in line with a reference standard state of compliance, applied to an exemplary target machine/software 11. This statement is completely user-identified and is not entered by a PAGE program. Also in this embodiment, a fourth column, e.g. labelled 'Mitigation' 511, can be output with an identification of a workaround or system of workarounds not falling directly in line with a reference standard state of compliance. This statement is completely user-identified and is not entered by the PAGE program 6. Also in this embodiment, a sixth column, e.g. labelled 'Point of Contact (PoC)' 513, can be output with an identification of a person or group of people associated with security compliance of an exemplary target machine/software 11. Also in this embodiment, a seventh column, e.g. labelled 'Resources Required' 515, can be output with an identification of exemplary resources needed to implement compliance for a security non-compliance item, or a mitigation for that item. This statement is completely user-identified and is not entered by a PAGE program 6. Also in this embodiment, an eighth column, e.g. labelled 'Scheduled Completion Date' 517, can be output with an identification of the date that compliance or mitigation will occur for an exemplary identified security non-compliance item. This statement is completely user-identified and is not entered by the PAGE program 6. Also in this embodiment, a ninth column, e.g. labelled 'Milestones Changed' 519, can be output with an identification of any exemplary program milestones that might change because of a security impact of an identified security non-compliance item. This statement is completely user-identified and is not entered by the PAGE program 6. Also in this embodiment, a tenth column, e.g. labelled 'Source Identifying Weakness'

521, can be output with an identification of an exemplary Scanning/Security Software 12, e.g. ACAS, an exemplary reference standards document, e.g. ACAS plugin ID number, and a specific date and reason for an exemplary scan event, all of which are used to specifically identify an exemplary security non-compliance item. Also in this embodiment, an eleventh column, e.g. labelled 'Status' 523, can be output with an identification of whether an exemplary security non-compliance item has been brought into a state of compliance, e.g. "Closed", a state of mitigation, e.g. "Mitigated", or a continued state of non-compliance, e.g. "Open". This statement is completely user-identified and is not entered by a PAGE program 6. Also in this embodiment, a twelfth column, e.g. labelled 'Comments' 525, can be output with an identification of exemplary comments by engineers, integrators, or approving officials on an exemplary security non-compliance item and associated data in an exemplary Excel document in POA&M format 14 or 15. This statement is completely user-identified and is not entered by a PAGE program 6.

FIG. 14A also shows an exemplary POA&M format output, e.g. Code Review POA&M 600. In this embodiment a first column, e.g. labelled Issue ID 603, allows for a specific identification code identifying an issue or finding/error/risk found in the scan. Further, this embodiment includes a second column, e.g. labelled Application/Module 605, that specifies the name of an application or module that was scanned in a TC 10. Also in this embodiment, a third column, e.g. labelled Code Review Finding 607, shows the specific file path/location where an issue has been found. Further, a fourth column, e.g. labelled Abstract 609, contains a summary of the issue. This embodiment also includes a fifth column, e.g. labelled Category, that describes the classification of the issue found by the scan.

FIG. 14B continues the embodiment of the invention shown in FIG. 14A. The first column, e.g. labelled 'Fortify Priority' 613, indicates the severity of the issue and a recommendation for how soon to mitigate the issue, based on a four level standard: low, medium, high, or critical. A second column, e.g. labelled 'STIG' 615. A third column, e.g. labelled 'False Positive (Y/N)' 619. A fourth column, e.g. labelled 'Justification for False Positive' 619. A fifth column, e.g. labelled 'Mitigation' 621, can be output with an identification of a workaround or system of workarounds not falling directly in line with a reference standard state of compliance. A sixth column in this embodiment, e.g. labelled 'Code Review Software Version' 623, displays the current code version at the time the scan was completed. A seventh column, e.g. labelled 'STIG Version' 625, shows a current version of a STIG at the time that scan was completed. An eighth column, e.g. labelled 'Original Scan Date' 627, displays the date on which the scan was performed. A ninth column, e.g. labelled 'Project Release Found' 629 (e.g., a user enter column for project management). A tenth column, e.g. labelled 'Project Release Fixed' 631. An eleventh column, e.g. labelled 'Estimated Completion Date' 633. A twelfth column, e.g. labelled 'Actual Completion Date 635. Finally in this embodiment is a thirteenth column, e.g. labelled 'Comments' 637, can be output with an identification of exemplary comments by engineers, integrators, or approving officials on an exemplary security non-compliance item and associated data in an exemplary Excel document in POA&M format 14 or 15. This statement is completely user-identified and is not entered by a PAGE program 6.

The invention claimed is:

1. A system for generating a plan of action and milestone (POA&M) product comprising:
a network system comprising data communication systems adapted to communication with different network elements;
a first system group comprising a plurality of first computers each connected with the network system, each further respectively comprises a first processor and a first machine code storage medium storing a first and second category of machine readable instructions each adapted to operate a first system group processor, the first category machine readable instructions comprising application software and operating system files and the second category of plurality of machine readable instructions comprises scanning systems configured to selectively scan the first category of machine instructions and compare scan results with a plurality of system configuration files to generate target system configuration data for each scanned first computer; and
a second computer connected with the network system comprising:
a second processor and second machine instruction storage medium adapted for storing a plurality of second computer machine readable instructions comprising:
a first plurality of second computer machine readable instructions adapted for comparing the target system configuration data for each scanned first computer with a plurality of configuration baseline files and determining matches and no-matches with the target system configuration file data and outputting a comparison results file;
a second plurality of second computer machine readable instructions comprising user interface generator instructions that the second processor uses to generate one or more POA&M generator user interfaces for enabling selection of a POA&M template, problem, or mission from a POA&M template library list, input POA&M related data, and enable user selection of a range of output options associated with the selected POA&M template, problem or mission; and
a third plurality of second computer machine readable instructions further comprising an expert system for generating POA&M outputs based on the user interface inputs including selected POA&M template and POA&M data output selection rules, the third plurality of machine readable instructions further comprise instructions that parse each target system configuration data for each scanned first computer, select one or more of said first category of machine readable instructions on a respective said first computer that do not match one or more of the configuration baseline files' data, and populate the POA&M data output file for each mismatch or no-match along with a recommended action drawn from a library of recommended action files that are associated with each no-match.

2. The system as in claim 1, wherein said second category of machine readable instructions generate said target system configuration data based in part on Security Content Automation Protocol (SCAP) file output elements, Assured Compliance Assessment Solution (ACAS) file output elements, or Security Technical Implementation Guide (STIG) output elements.

* * * * *